United States Patent
Inoguchi et al.

[11] Patent Number: 6,061,179
[45] Date of Patent: *May 9, 2000

[54] STEREOSCOPIC IMAGE DISPLAY APPARATUS WITH TWO-/THREE-DIMENSIONAL IMAGE DISPLAY SWITCHING FUNCTION

[75] Inventors: Kazutaka Inoguchi, Kawasaki; Hiroyasu Nose, Tokyo; Tsutomu Osaka; Hideki Morishima, both of Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/786,855

[22] Filed: Jan. 22, 1997

[30] Foreign Application Priority Data

Jan. 23, 1996 [JP] Japan ..................................... 8-009301
May 27, 1996 [JP] Japan ..................................... 8-154968

[51] Int. Cl.$^7$ .......................... G02B 27/22; G02B 27/10; H04N 9/47
[52] U.S. Cl. .......................... 359/464; 359/463; 359/462; 359/621; 359/622; 359/623; 359/624; 348/59
[58] Field of Search .................................. 359/462, 463, 359/618, 619, 620, 621, 622, 623, 624, 625, 626; 348/54, 59; 349/15, 64, 95

[56] References Cited

U.S. PATENT DOCUMENTS 4,957,351  9/1990  Shioji ....................................... 359/462
5,410,345  4/1995  Eichenlaub ............................... 359/475
5,661,603  8/1997  Hanano et al. ........................... 359/622

Primary Examiner—Audrey Chang
Attorney, Agent, or Firm—Morgan & Finnegan, LLP

[57] ABSTRACT

The present invention relates to a stereoscopic image display apparatus having light source means for emitting a light beam having a predetermined shape, a transmission type display device for displaying an image, a micro optical element arranged between the light source means and the display device and having different optical effects in horizontal and vertical directions, the micro optical element irradiating the light beam emitted by the light source means onto the display device by giving directivity to the light beam to split the light beam into at least two regions, and adjusting means for adjusting an interval between the light source means and the micro optical element in correspondence with an image displayed on the display device.

16 Claims, 23 Drawing Sheets

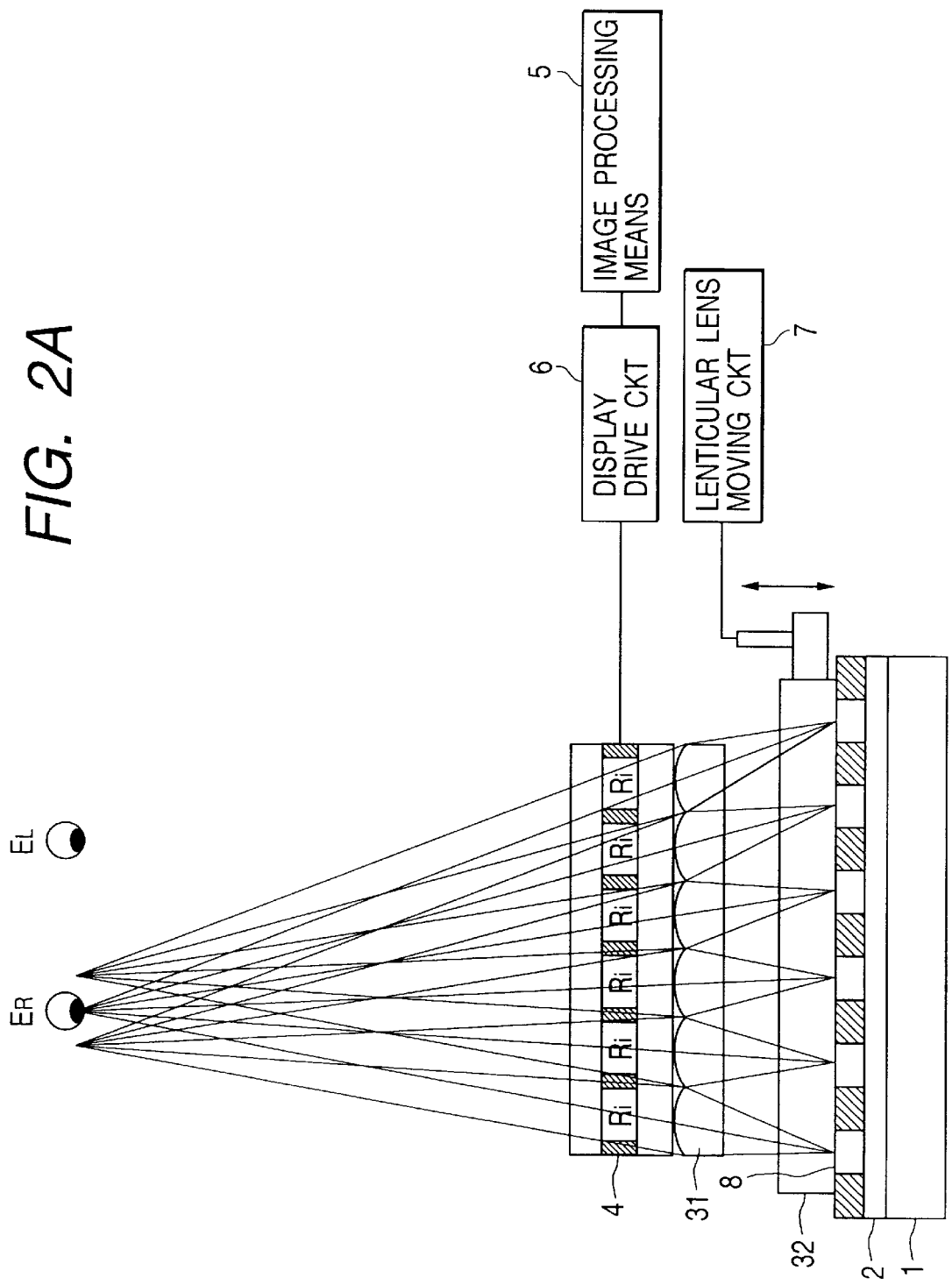

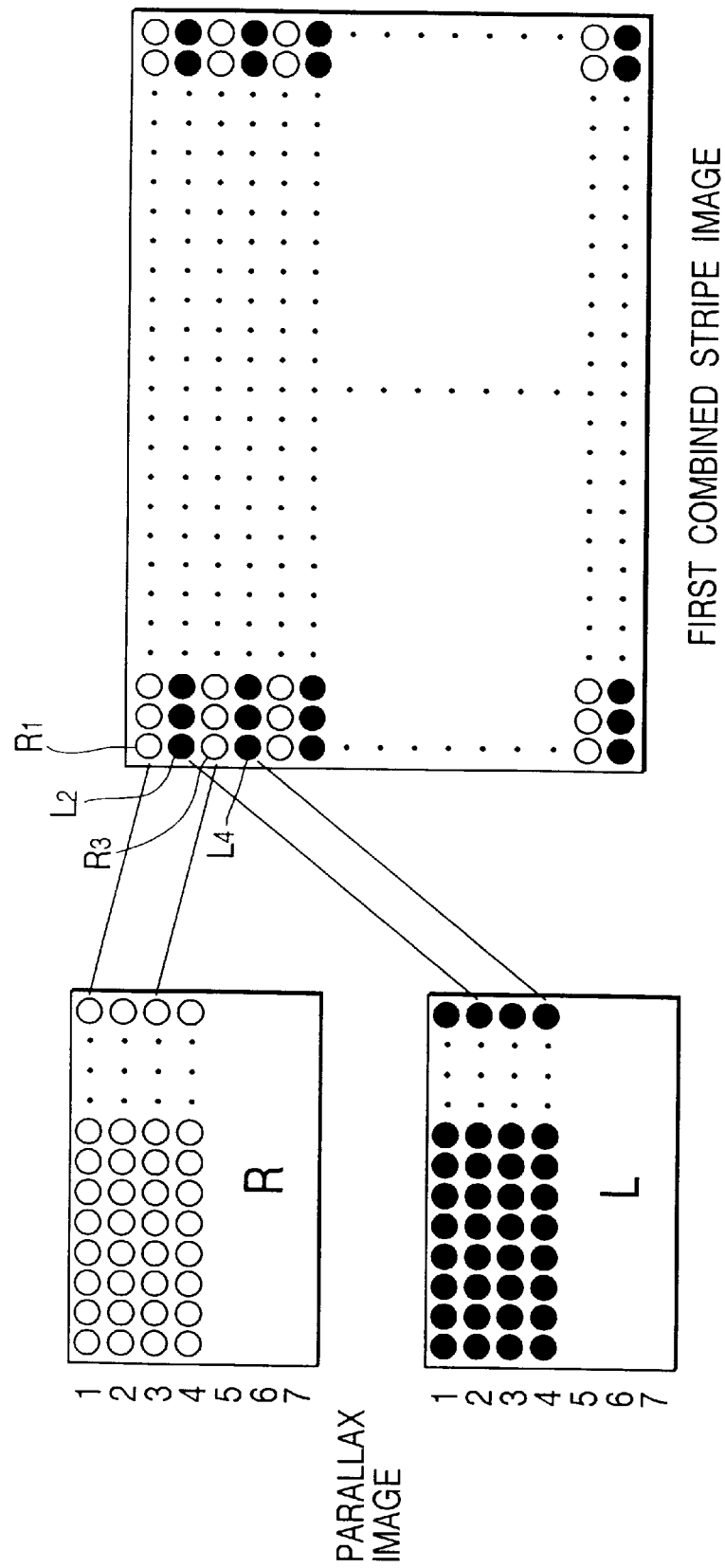

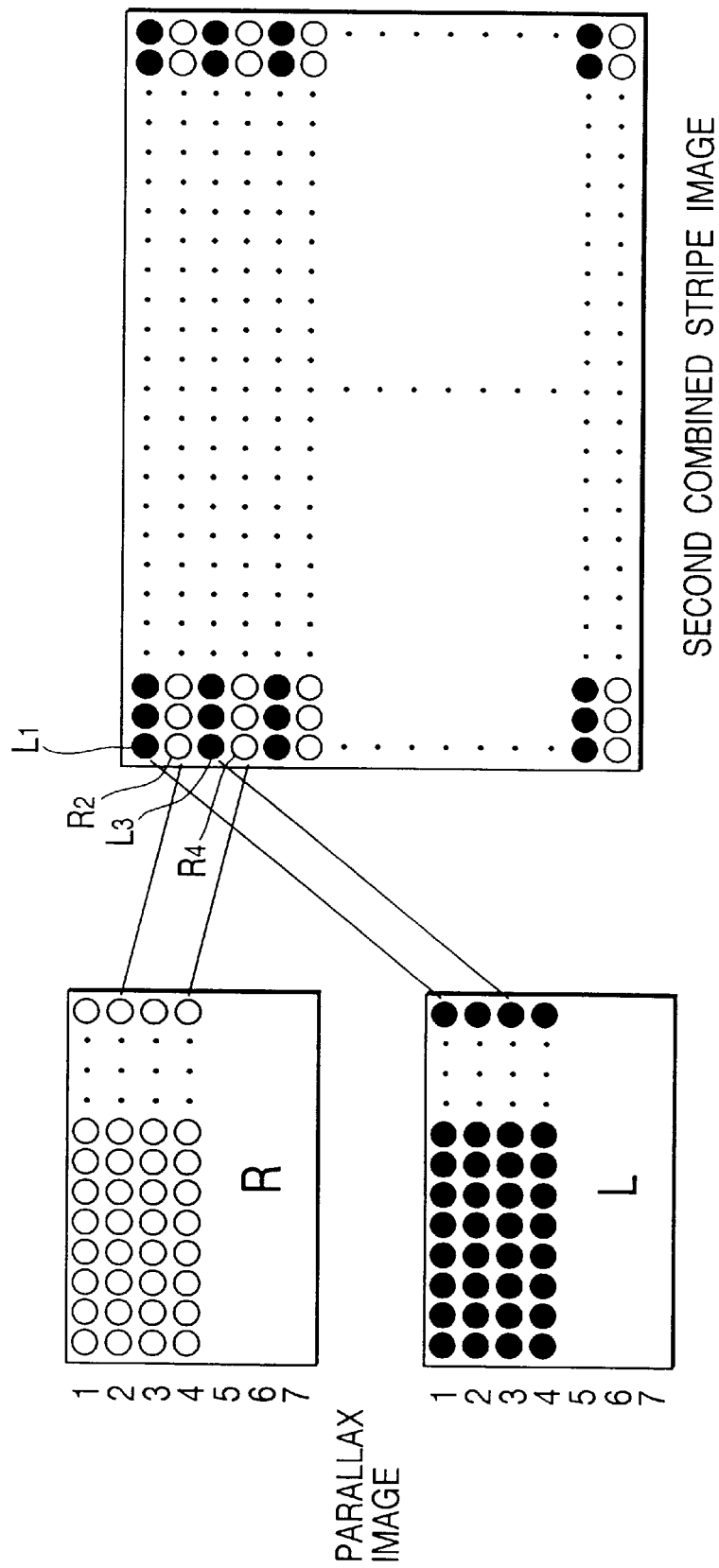

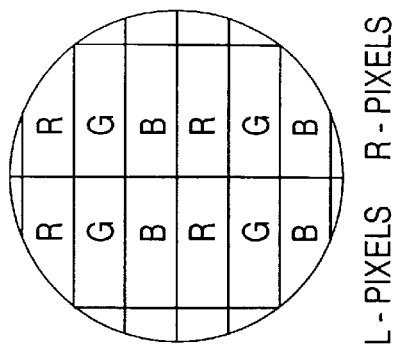
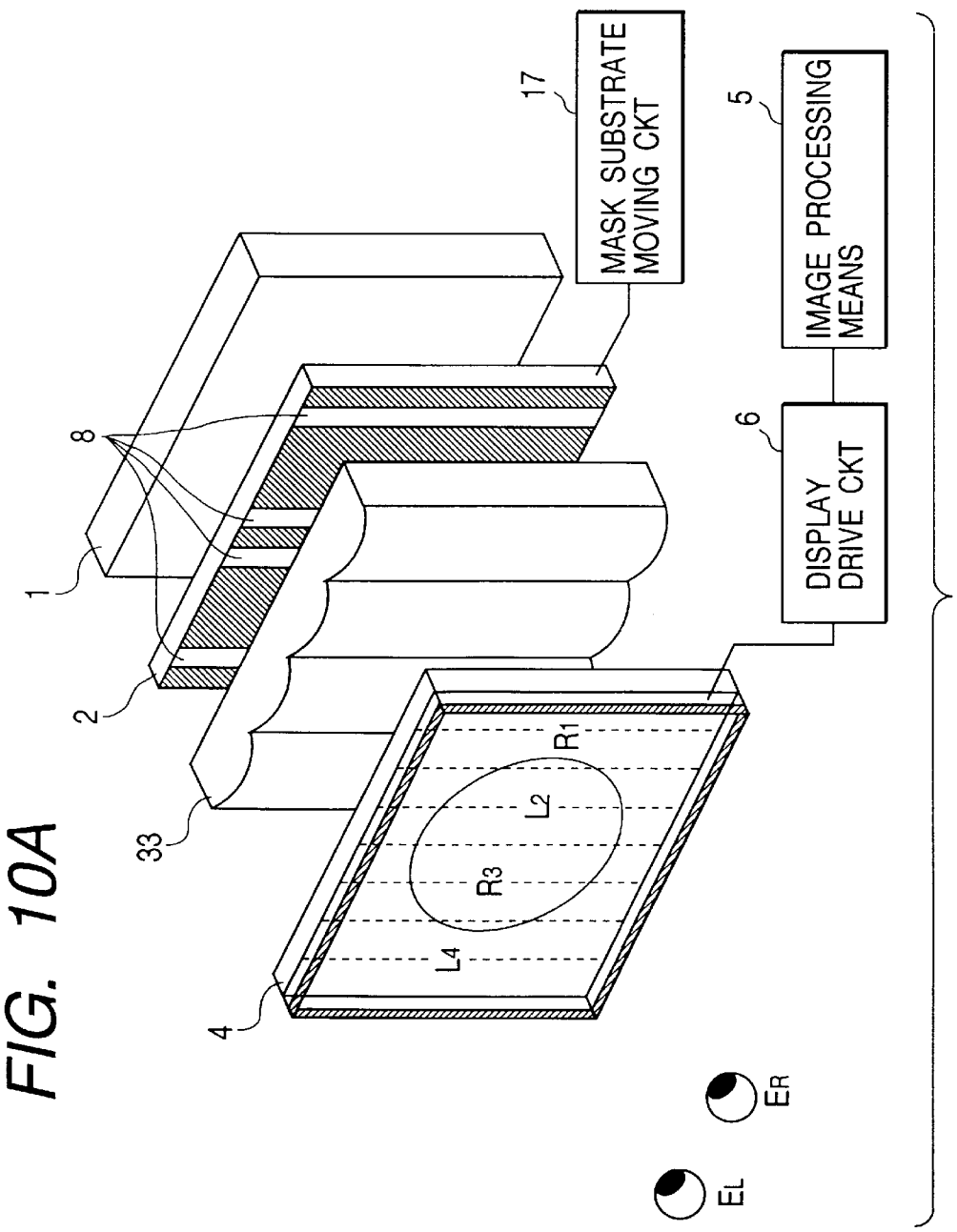
FIG. 10B
FIG. 10A

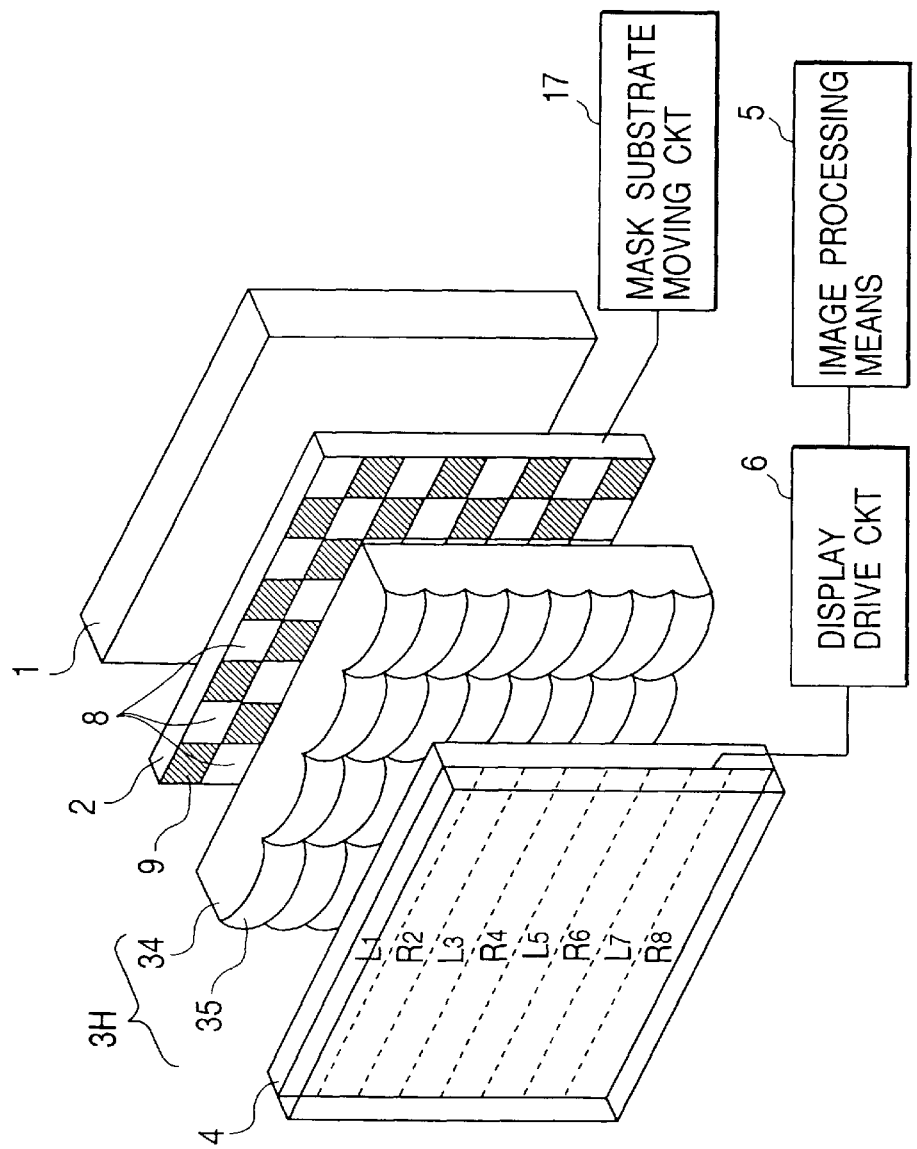

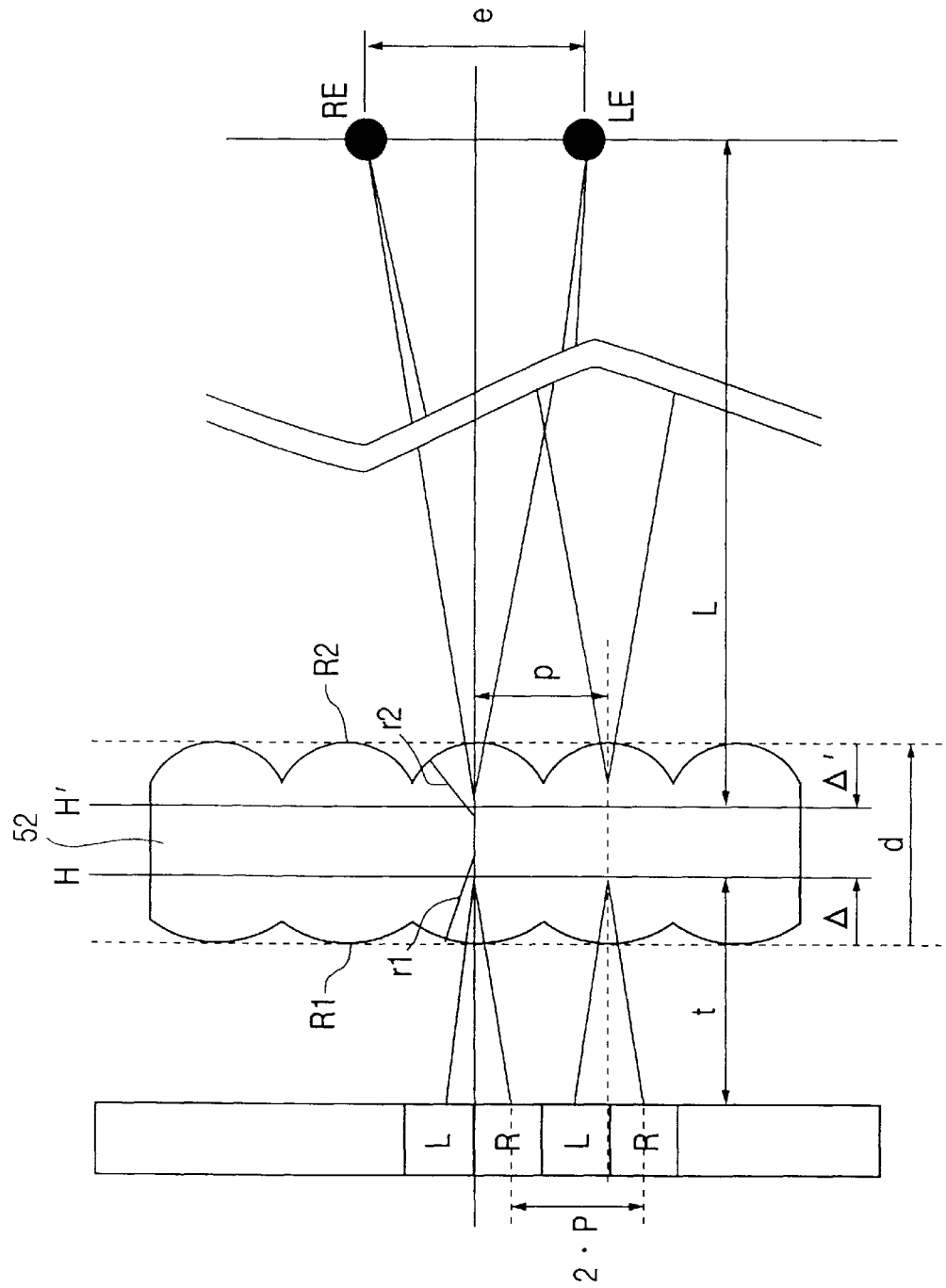

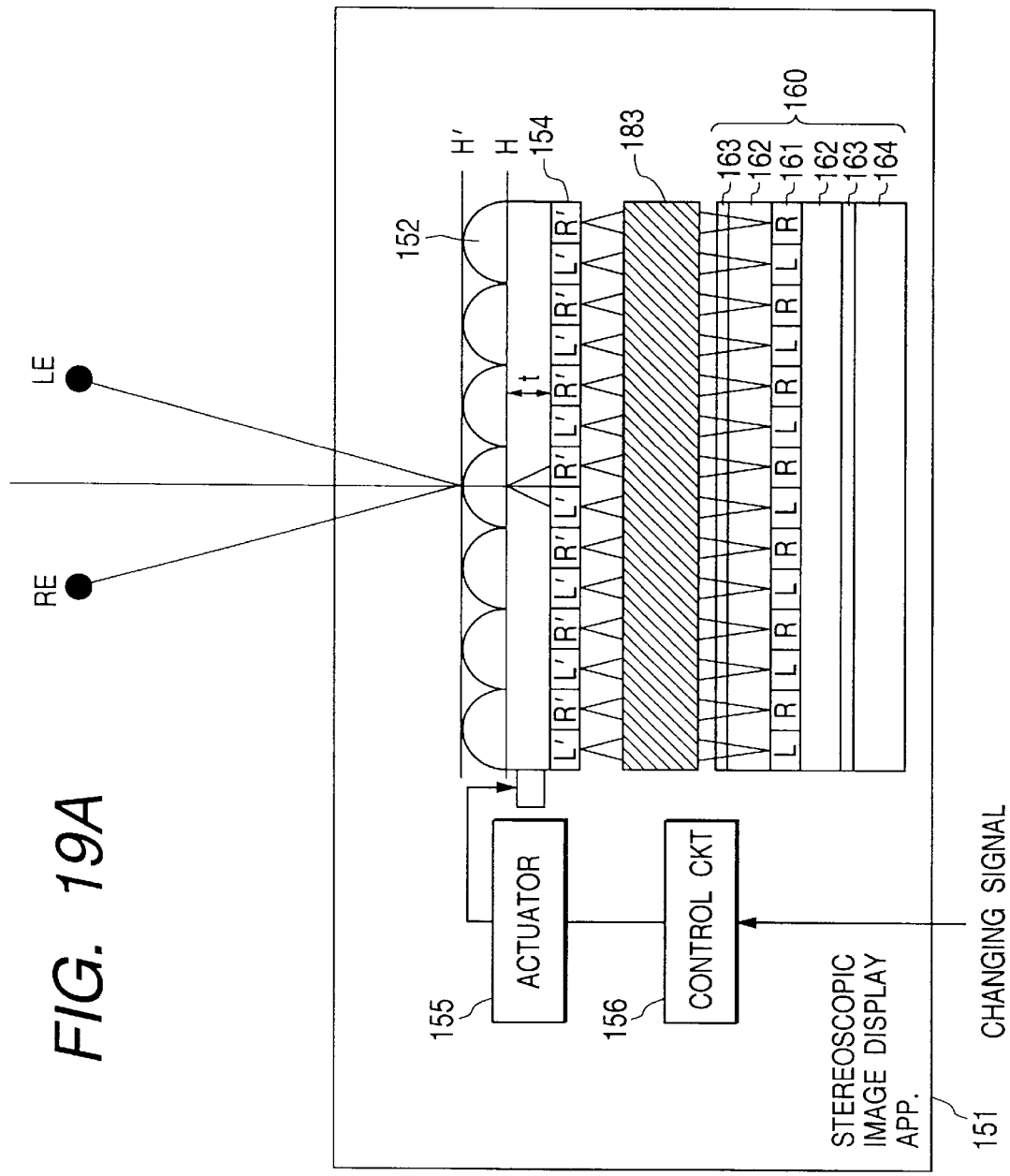

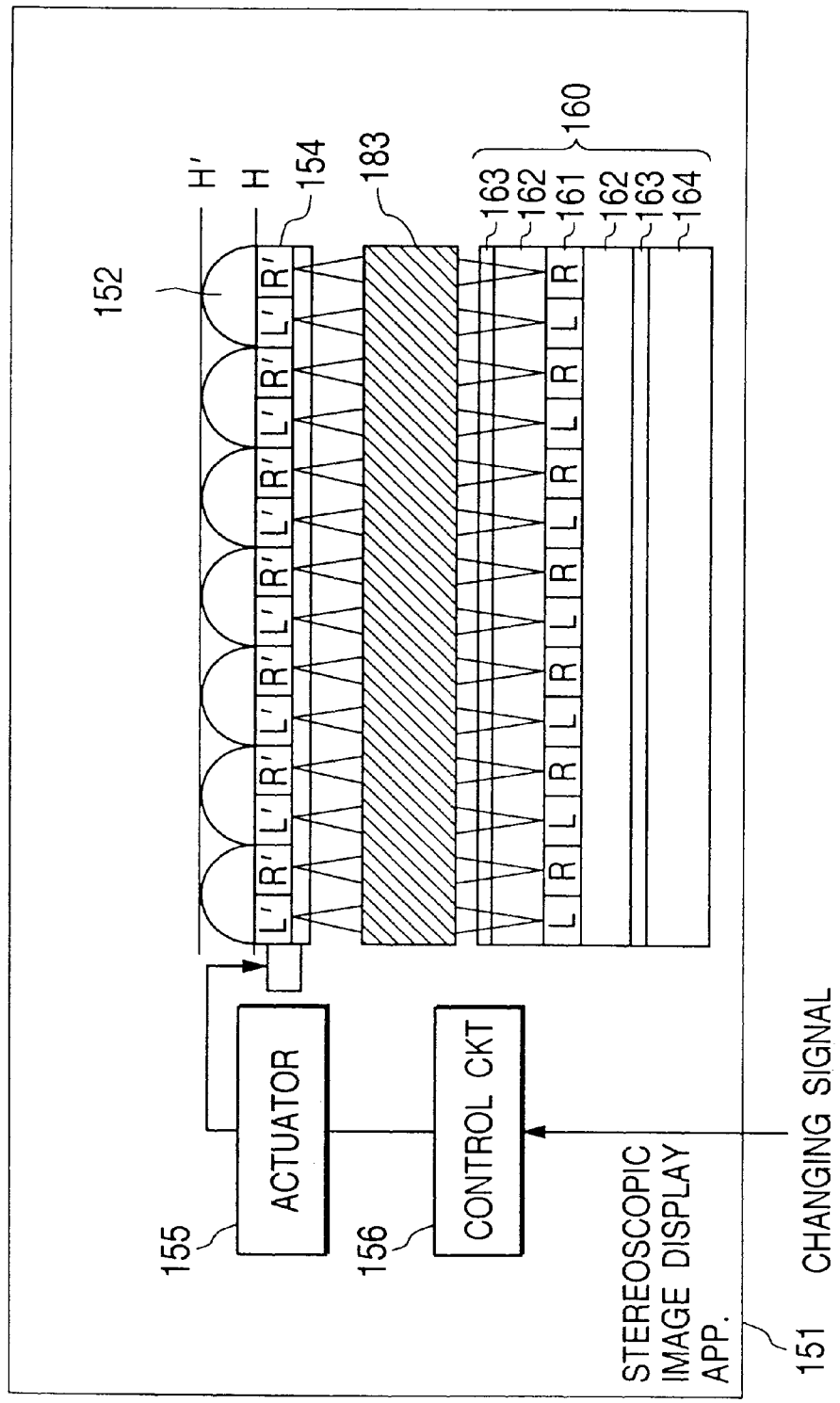

STEREOSCOPIC IMAGE DISPLAY APPARATUS WITH TWO-/THREE-DIMENSIONAL IMAGE DISPLAY SWITCHING FUNCTION

BACKGROUND OF THE INVENTION

1. Field of the Invention

The present invention relates to a stereoscopic image display apparatus and, more particularly, to an apparatus suitable for selectively displaying three- and two-dimensional images.

2. Related Background Art

Conventionally, as a stereoscopic image display apparatus not using any spectacles, a lenticular lens type apparatus and a parallax barrier type apparatus are known.

In these two types of apparatuses, a stripe image must be combined by alternately arranging stripe pixels using two parallax images, and the combined image must be displayed. For this reason, the resolution of the stereoscopic image display apparatus is decreased to ½ that of the image display means.

In particular, even when a two-dimensional image is displayed, the resolution is also decreased to ½ or less that of the image display means itself.

However, in the parallax barrier type apparatus, the parallax barrier is an eyesore. Also, in the conventional lenticular lens type apparatus, since a lenticular lens is arranged on the observer side of the image display means (display device), and the screen surface glitters, the lenticular lens is an eyesore.

SUMMARY OF THE INVENTION

It is an object of the present invention to provide a stereoscopic image display apparatus which can selectively display a three-dimensional image (stripe image) and a two-dimensional image, can prevent the resolution of an image display means from lowering upon displaying the two-dimensional image, and can also prevent glittering of the screen surface to present a high-quality image.

In order achieve the above object, according to an aspect of the present invention, a stereoscopic image display apparatus comprises:

light source means for emitting a light beam having a predetermined shape;

a transmission type display device for displaying an image;

a micro optical element arranged between the light source means and the display device and having different optical effects in horizontal and vertical directions, the micro optical element irradiating the light beam emitted by the light source means onto the display device by giving directivity to the light beam to split the light beam into at least two regions; and changing means for selectively changing the distance between said light source means and said micro optical element into any of first and second predetermined distances.

The light source means comprises a surface illuminant, and a mask substrate consisting of aperture portions and light-shielding portions each having a predetermined shape, and illuminates the mask substrate with light emitted by the surface illuminant and illuminates the micro optical element with light beams emerging from the aperture portions.

The adjusting means changes an interval between the mask substrate and the micro optical element.

The light source means comprises a self-emission type display element having a light-emission surface consisting of light-emitting portions and non-emitting portions each having a predetermined shape.

The adjusting means changes an interval between the light-emission surface and the micro optical element.

The micro optical element comprises a vertical cylindrical lens array constituted by periodically arranging vertically elongated cylindrical lenses in the horizontal direction, and a horizontal cylindrical lens array constituted by periodically arranging horizontally elongated cylindrical lenses in the vertical direction.

When a stripe image combined by alternately arranging right and left stripe pixels respectively obtained by dividing parallax images for right and left eyes into a large number of stripe pixels in a predetermined order is displayed on the display device, the adjusting means sets a distance from a principal plane, on the light source means side, of the horizontal cylindrical lens array to the light source means to be substantially zero.

When a two-dimensional image is displayed on the display device, the adjusting means sets a distance from a principal plane, on the light source means side, of the horizontal cylindrical lens array to the light source means to be a value not less than twice a focal length of the cylindrical lenses which constitute the horizontal cylindrical lens array.

When a two-dimensional image is displayed on the display device, and when f represents the focal length of the vertical cylindrical lens array, t0' represents the distance from a principal plane, on the light source means side, of the horizontal cylindrical lens array to the light source means, and t' represents the distance between a principal plane, on the observer side, of the horizontal cylindrical lens array and the display device, the parameters satisfy:

$$t'/t0' > f/(t0'-f)$$

The micro optical element comprises a toric lens array constituted by two-dimensionally arranging toric lenses, each having different vertical and horizontal focal lengths, in the vertical and horizontal directions.

When a two-dimensional image is displayed on the display device, the adjusting means sets a distance from a principal plane, on the light source means side, of the toric lens array to the light source means to be a value not less than twice the vertical focal length of the toric lenses which constitute the toric lens array.

According to another aspect of the present invention, a stereoscopic image display apparatus comprises:

image display means for displaying an image;

first optical means for refracting a light beam from the image display means;

second optical means, arranged between the image display means and the first optical means, for forming the image of the image display means on the first optical means side by guiding the light beam from the image display means to the first optical means; and control means for changing a distance between the second optical means and the first optical means.

The control means moves the first optical means.

When a three-dimensional image is displayed, the control means sets a distance between an image forming position formed by the second optical means and a principal plane of the first optical means to substantially equal a focal length of the first optical means.

When a two-dimensional image is displayed, the control means sets an image forming position formed by the second optical means to substantially match a principal plane of the first optical means.

The second optical means comprises an optical element having a periodic structure.

The detailed embodiments of the present invention will become apparent from the following description of some embodiments.

BRIEF DESCRIPTION OF THE DRAWINGS

FIGS. 2A and 2B are horizontal sectional views when the apparatus of the first embodiment is in the three-dimensional display mode;

FIGS. 3A and 3B are explanatory views of a horizontal stripe image in the first embodiment;

FIGS. 10A and 10B are schematic views showing application examples of the third embodiment;

FIG. 15 is a schematic perspective view showing another arrangement of the fourth embodiment;

FIGS. 16A and 16B are views showing a stereoscopic image display apparatus according to the fifth embodiment of the present invention, in which FIG. 16A shows the three-dimensional image display state, and FIG. 16B shows the two-dimensional image display state;

FIG. 17 is a view for explaining the relationship between the shape and layout of a lenticular sheet shown in FIGS. 16A and 16B;

FIGS. 19A and 19B are views showing a stereoscopic image display apparatus according to the sixth embodiment of the present invention, in which FIG. 19A shows the three-dimensional image display state, and FIG. 19B shows the two-dimensional image display state.

DESCRIPTION OF THE PREFERRED EMBODIMENTS

Figure 1:
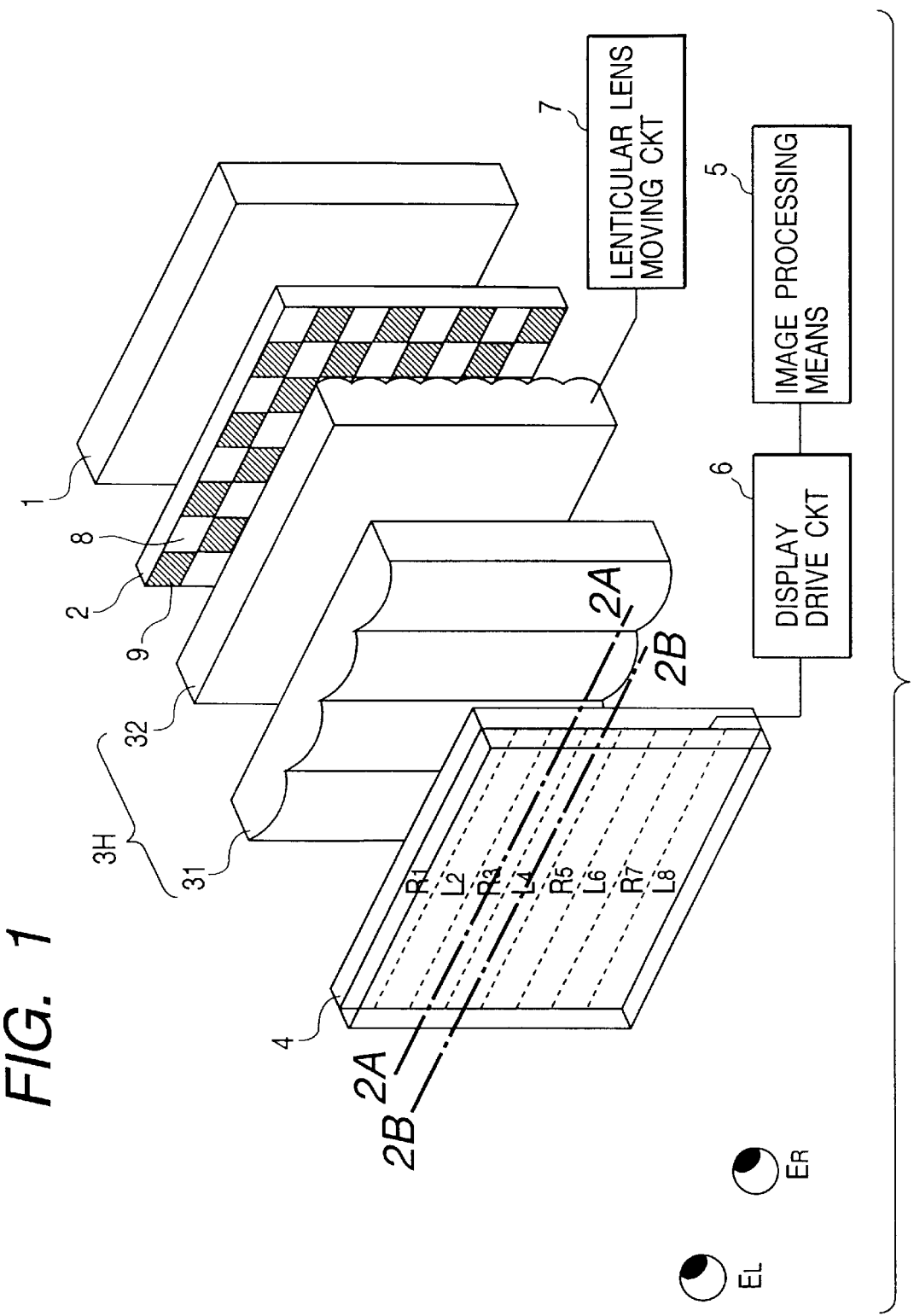
FIG. 1 is a schematic perspective view showing principal art of a stereoscopic image display apparatus according to the first embodiment of the present invention.

FIG. 1 is a schematic perspective view showing a stereoscopic image display apparatus according to the first embodiment of the present invention. This embodiment provides a stereoscopic image display apparatus that can selectively display a three-dimensional image (3D image or stereoscopic image) and a two-dimensional image (2D image).

Referring to FIG. 1, a backlight light source (surface illuminant) 1 is arranged behind a mask substrate (mask) 2 formed with a mask pattern 9 having aperture portions 8 and light-shielding portions in a checkerboard pattern. The mask pattern is formed by patterning chromium or a light-absorbing member on a substrate such as a glass substrate, plastic substrate, or the like. The backlight light source 1 and the mask substrate 2 constitute a light source means. A display device (image display means) 4 comprises a transmission type liquid crystal element which has a display pixel portion (image display surface) formed between two glass substrates.

A first lenticular lens 31 and a second lenticular lens 32 consisting of a transparent resin or glass are arranged between the mask 2 and the display device 4. The first lenticular lens 31 comprises a vertical cylindrical lens array constituted by arranging vertically elongated vertical cylindrical lenses in the right-and-left direction, and the second lenticular lens 32 comprises a horizontal cylindrical lens array constituted by arranging horizontally elongated horizontal cylindrical lenses in the up-and-down direction. Note that the first and second lenticular lenses 31 and 32 constitute a micro optical element 3H.

Figure 2B:
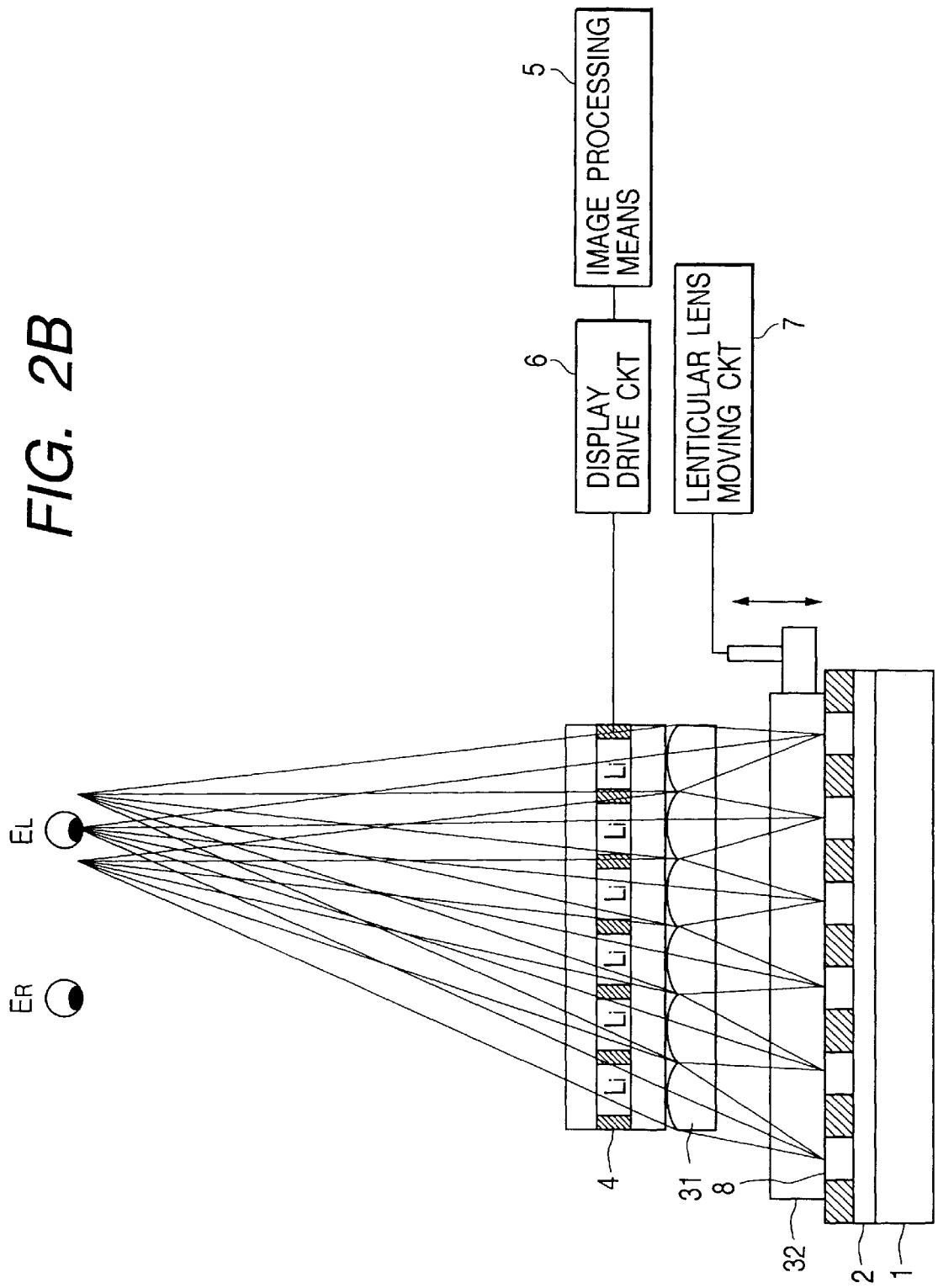

The arrangement and operation upon displaying a three-dimensional (3D) image in this embodiment will be explained below. FIGS. 2A and 2B are horizontal sectional views when the apparatus of the first embodiment is in the three-dimensional image display mode. FIG. 2A is a sectional view taken along the horizontal plane indicated by a line 2A—2A in FIG. 1, and FIG. 2B is a sectional view taken along the horizontal plane indicated by a line 2B—2B (which is a scanning line immediately below that indicated by the line 2A—2A). FIG. 1 and FIGS. 2A and 2B depict the states of an image displayed on the image display surface.

In the following description, images such as CG images created on a computer are used as parallax images. Alternatively, natural images taken by a dual-lens camera or a stereoscopic camera may be used as parallax images.

An image to be displayed on the display device (liquid crystal display) 4 will be explained below. FIGS. 3A and 3B are explanatory views of the image (horizontal stripe image). As shown in FIG. 3A, right- and left-eye parallax images R and L are divided into a large number of stripe pixels $R_i$ and $L_i$ each having a horizontal stripe shape by an image processing means 5, and the divided stripe pixels are alternately arranged in the order of, e.g., $R_1$, $L_2$, $R_3$, $L_4$, $R_5$, $L_6$, . . . (or $L_1$, $R_2$, $L_3$, $R_4$, $L_5$, $R_6$, . . . ) in units of scanning lines from the upper edge of the screen, so as to form a single stripe image (three-dimensional image) (this image will be referred to as a first combined stripe image hereinafter).

The image data of the formed horizontal stripe image is input to a display drive circuit 6 to display the horizontal stripe image on the display device 4.

On the liquid crystal display 4, the stripe images are alternately arranged, so that the right- and left-eye horizontal stripe pixels $R_i$ and $L_i$ are vertically paired in correspondence with one aperture of the mask pattern 9 (FIG. 1).

As shown in FIG. 2A, light emitted by the backlight light source 1 is transmitted through the mask 2, which has the centers of the aperture portions 8 at positions offset by a predetermined distance from the optical axes of the cylindrical lenses of the first lenticular lens 31. Light beams transmitted through the mask 2 are split by the cylindrical lenses of the first lenticular lens 31, and the split light beams are incident on a right eye $E_R$ of the observer. The light beams incident on the right eye $E_R$ are modulated by the stripe pixel (in this case, the right stripe pixel $R_i$) displayed on the display device 4 arranged between the first lenticular lens 31 and the observer.

Likewise, as for light beams along the section corresponding to the scanning line immediately below that shown in FIG. 2A, light beams modulated by the horizontal stripe pixel $L_i$ constituting the left parallax image are incident on a left eye $E_L$, as shown in FIG. 2B. At this time, as can be seen from FIG. 1, the mask pattern of the mask 2 forms aperture portions and light-shielding portions in a checkerboard pattern, and the mask aperture portions 8 in the section in FIG. 2A and those in the section in FIG. 2B are complementary. Therefore, the observer observes stripe pixels corresponding to right and left eyes with his or her right and left eyes in units of scanning lines, and can observe a stereoscopic image by visually recognizing parallax images constituted by these stripe pixels.

At this time, the convex surface vertices of the cylindrical lenses constituting the second lenticular lens 32 are in tight contact with the mask 2 (so predetermined first distance between light source means and micro optical means in this embodiment=0). That is, since the principal plane of the second lenticular lens 32 matches the mask pattern, the influence of the refractive power of the lens 32 can be substantially ignored, and the optical effect of the second lenticular lens 32 need not be considered in the horizontal plane.

The arrangement and operation upon displaying a two-dimensional (2D) image in this embodiment will be explained below.

Figure 4:
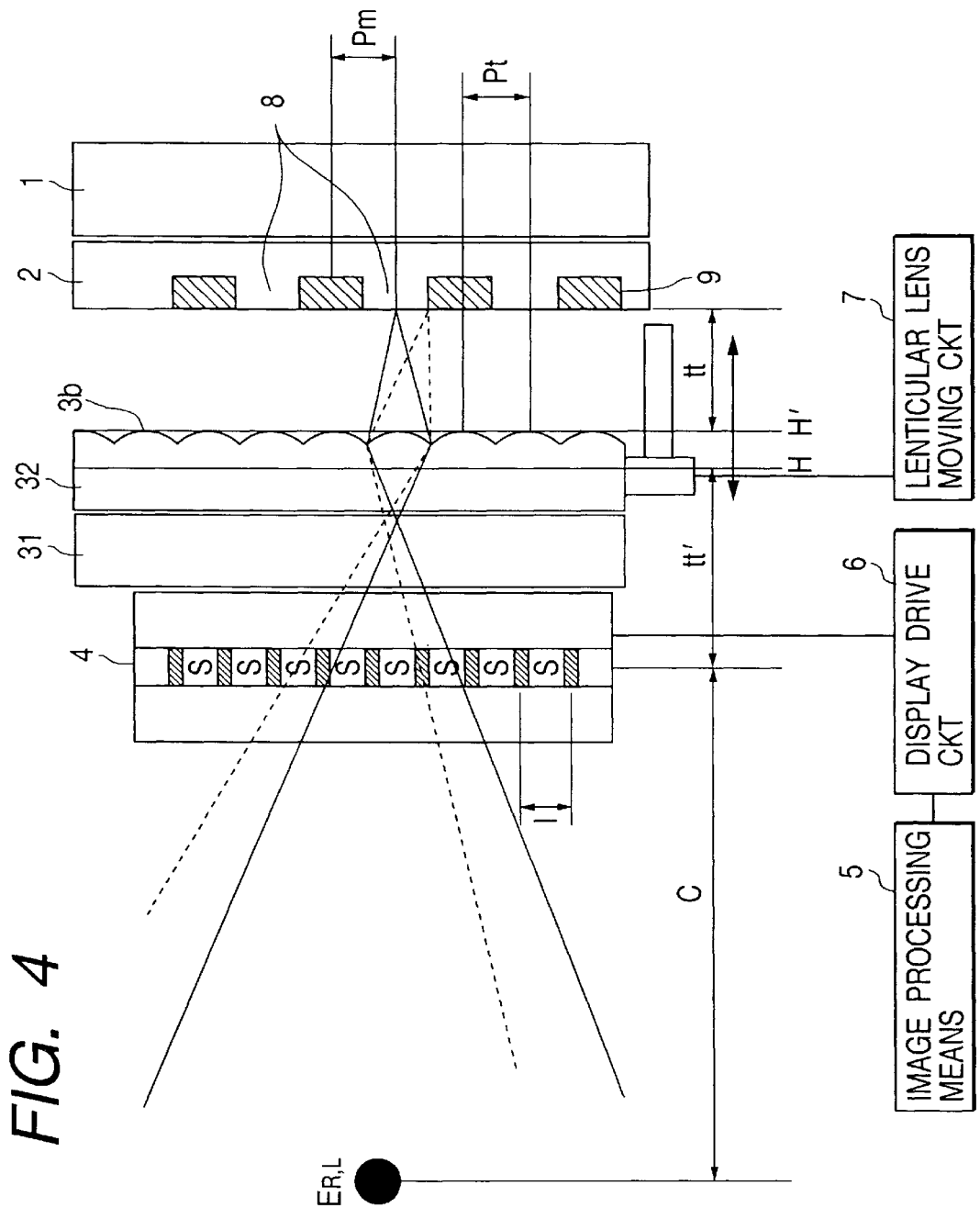
FIG. 4 is a vertical sectional view when the apparatus of the first embodiment is in the two-dimensional image display mode.

FIG. 4 is a vertical sectional view when the apparatus of this embodiment is in the two-dimensional image display mode. A controller (not shown) supplies, e.g., a changing signal for changing the display mode to the two-dimensional image display mode to a lenticular lens moving circuit 7 (changing means in this embodiment) to move the second lenticular lens 32 from the position (predetermined first distance) where it is in tight contact with the mask 2 in FIGS. 2A and 2B to the position separated from the mask 2 by a predetermined distance (predetermined second distance between light source means and micro optical means, will be referred hereinafter).

At this time, the image processing means 5 does not perform any combining processing of a stripe image, and a normal two-dimensional image is displayed on the display device 4.

In this embodiment, the pitch, Pt, of cylindrical surfaces 3b, opposing the mask 2, of the second lenticular lens 32 is equal to the pitch, Pm, in the vertical section, of the mask pattern 9, and is slightly larger than the pixel pitch, I, of the display device 4.

Upon displaying a two-dimensional image, a distance tt (predetermined second distance in this embodiment) between a lens vertex H' of each cylindrical surface 3b of the second lenticular lens 32 and the mask pattern 9 is set to satisfy:

tt>2fb where fb is the focal length of each cylindrical lens configured by the cylindrical surface 3b.

At this time, when a distance tt' from a principal plane H, on the observer side, of the second lenticular lens 32 to the image display surface of the display device 4 is set in advance to satisfy:

1/tt'≧1/fb−1/tt the aperture portions 8 of the mask 2 are imaged in a reduced scale between the image display surface of the display device 4 and the second lenticular lens 32. Accordingly, both images of the apertures to which right and left directivities are to be given by the cylindrical lenses of the first lenticular lens 31 are imaged on the scanning lines that displayed the horizontal stripe pixels $L_i$ and $R_i$ upon displaying a three-dimensional image within the range where the observer can observe them via the scanning lines. Light beams passing through the respective scanning lines (pixels) on the image display surface propagate in both the right and left directions, and the observer can visually recognize all the pixels of the two-dimensional images with his or her eyes. Hence, a display free from a decrease in resolution with respect to that of the display device 4 can be realized. The operation in the two-dimensional image display mode has been described.

In this embodiment, since the lenticular lenses are located behind the display device 4 when viewed from the observer, the lenticular lenses do not stand out, and glittering of the screen surface can be prevented.

In the first embodiment, the horizontal stripe image is formed by alternately arranging and combining right and left horizontal stripe pixels in units of scanning lines. However, stripe pixels each having a width corresponding to a plurality of scanning lines may be displayed and combined.

In the first embodiment, the first combined stripe image is used upon displaying a stereoscopic image. Alternatively, as shown in FIG. 3B, a horizontal stripe image (second combined stripe image) obtained by combining a left stripe pixel $L_1$ in the first scanning line, a right stripe pixel $R_2$ in the second scanning line, a left stripe pixel $L_3$ in the third scanning line, . . . may be used. In this case, a mask pattern having aperture portions and light-shielding portions in a checkerboard pattern complementary to those used when the first combined stripe image shown in FIG. 3A is used may be used.

In this embodiment, the lenticular lenses 31 and 32, each having one flat surface, are used as the micro optical element 3H. As for the first lenticular lens 31, both the surfaces of each cylindrical lens that constitutes the lens 31 may have appropriate curvatures.

In the first embodiment, the two lenticular lenses 31 and 32 are independently arranged, and only the second lenticular lens 32 is moved. Alternatively, the two lenticular lenses may be integrally moved, or orthogonal cylindrical lens arrays having periodicities may be formed on the two surfaces of a single transparent substrate to obtain an integral structure, and the integral structure may be moved.

In place of moving the lenticular lens, a mechanism for moving the mask 2 may be arranged. In this case, a gap may be assured between the mask substrate 2 and the backlight light source 1 upon displaying a three-dimensional image, and the mask substrate 2 may be moved to satisfy the above-mentioned relation upon displaying a two-dimensional image.

Figure 5:
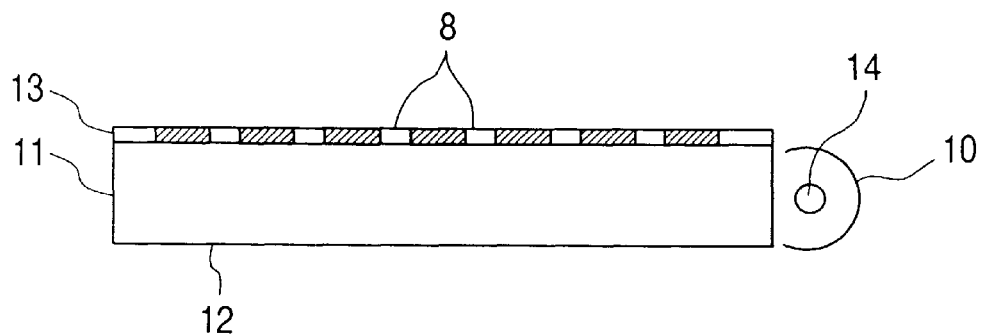
FIG. 5 is an explanatory view of an application example of the first embodiment.

FIG. 5 is an explanatory view of an application example of the first embodiment. In the first embodiment, the backlight light source 1 and the mask 2 having the mask pattern 9 are constituted as independent elements. However, in this application example, the light source 1 and the mask 2 are integrally formed. In FIG. 5, a reflection mirror 10 is arranged to surround a light source 14 such as a fluorescent lamp. A mask pattern 13 is formed by patterning a reflection material on the surface of on light guide 11 consisting of a transparent plastic material such as PMMA. These components constitute a light source means.

In this application example, light emitted by the light source 14 enters the light guide 11 from its end face together with the light reflected by the reflection mirror 10, and is guided inside the light guide 11. The guided light is transmitted through the mask pattern 13, and is incident on the pupils of the observer via the micro optical element 3H and the display device 4. With this arrangement, a stereoscopic image display apparatus with high light use efficiency can be realized. At this time, a reflection member is preferably formed on a rear surface 12 of the light guide 11.

Figure 6:
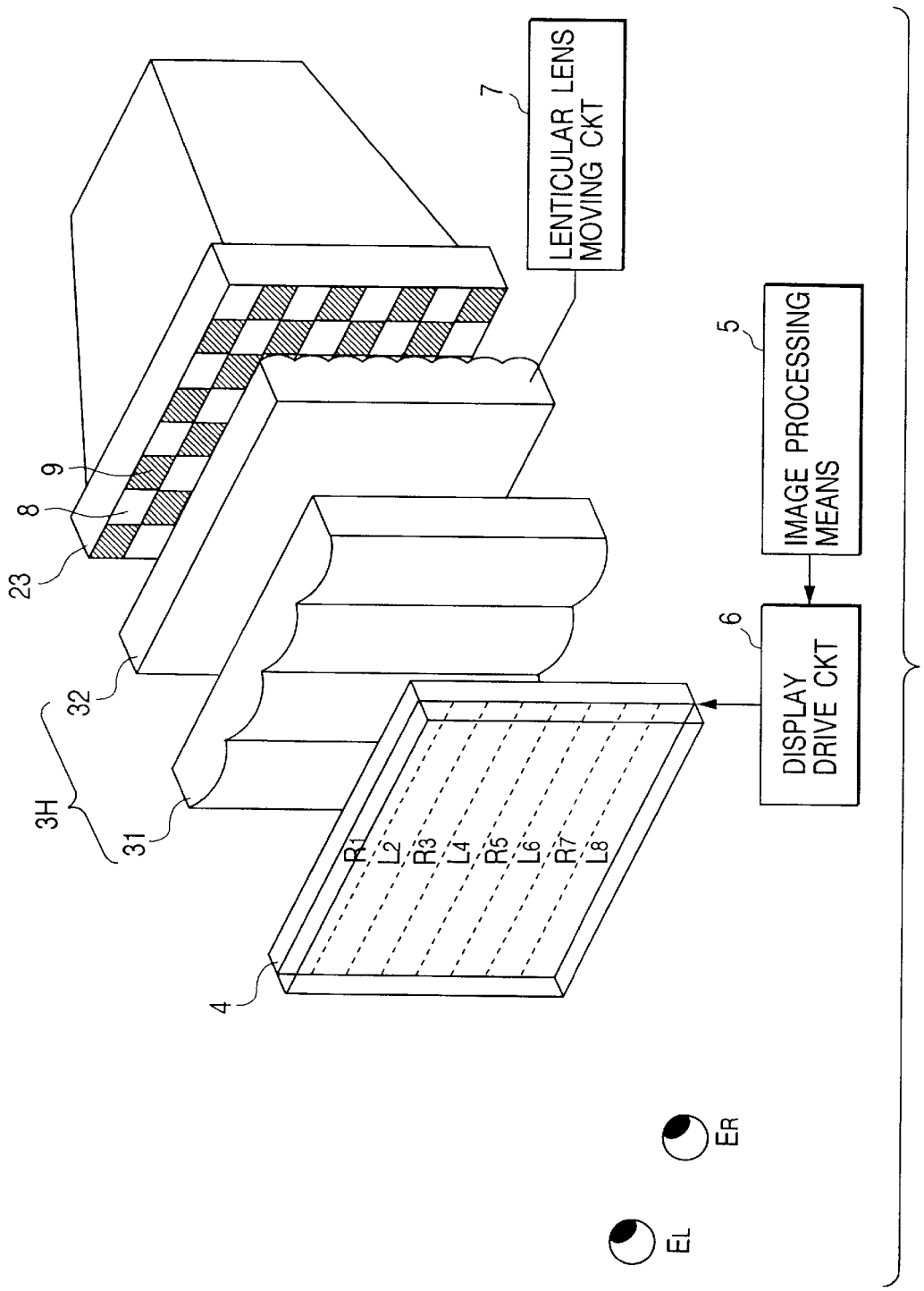
FIG. 6 is a schematic perspective view showing principal part of a stereoscopic image display apparatus according to the second embodiment of the present invention.

FIG. 6 is a schematic perspective view showing a stereoscopic image display apparatus according to the second embodiment of the present invention. In this embodiment, a self-emission type display element 23 such as a CRT is used in place of the backlight light source 1 and the mask pattern 9 in the first embodiment, and forms, on its display surface, a light-emission pattern consisting of light-emitting portions and non-emitting portions and having the same pattern as that of the mask pattern 9. A micro optical element 3H gives directivities to light beams exiting the light-emitting portions, thus realizing stereoscopic image display. The operations upon displaying 3D and 2D images are the same as those in the first embodiment. Note that the self-emission type display element 23 constitutes a light source means.

At this time, the self-emission type display element 23 and a display device 4 preferably perform displaying in synchronism with each other in units of pixels or scanning lines.

Figure 7:
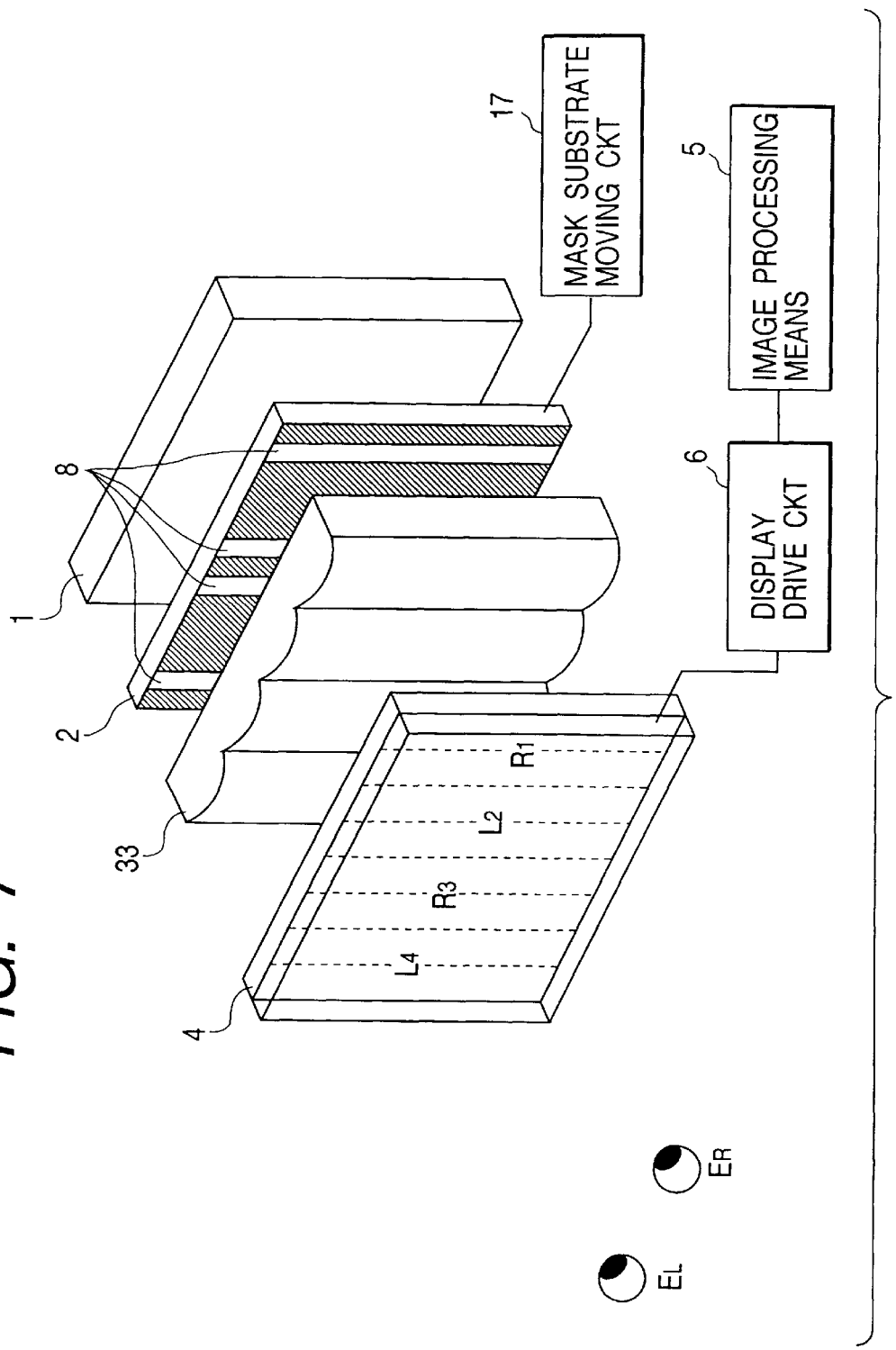
FIG. 7 is a schematic perspective view showing principal part of a stereoscopic image display apparatus according to the third embodiment of the present invention.

FIG. 7 is a schematic perspective view showing a stereoscopic image display apparatus according to the third embodiment of the present invention.

In the first embodiment, a horizontal stripe image is displayed on the display device 4. In this embodiment, the differences from the first embodiment are that right and left parallax images R and L are respectively divided into a large number of vertical stripe pixels $R_i$ and $L_i$ each having a vertical stripe shape and a vertical stripe image is formed by alternately arranging and combining the right and left stripe pixels in the right-and-left direction in units of pixels, a sole lenticular lens is used, aperture portions and light-shielding portions of a mask pattern are formed to have a vertical stripe shape, and a mask 2 is moved upon displaying a two-dimensional image. Other arrangements are the same as those in the first embodiment. Note that the same reference numerals in FIG. 7 denote the same parts as those described in the first embodiment.

More specifically, in the first embodiment, the two orthogonal lenticular lenses 31 and 32 are used. However, in this embodiment, only a lenticular lens (vertical cylindrical lens array) 33 constituted by periodically arranging a large number of vertical cylindrical lenses in the right-and-left direction is used.

Figure 8:
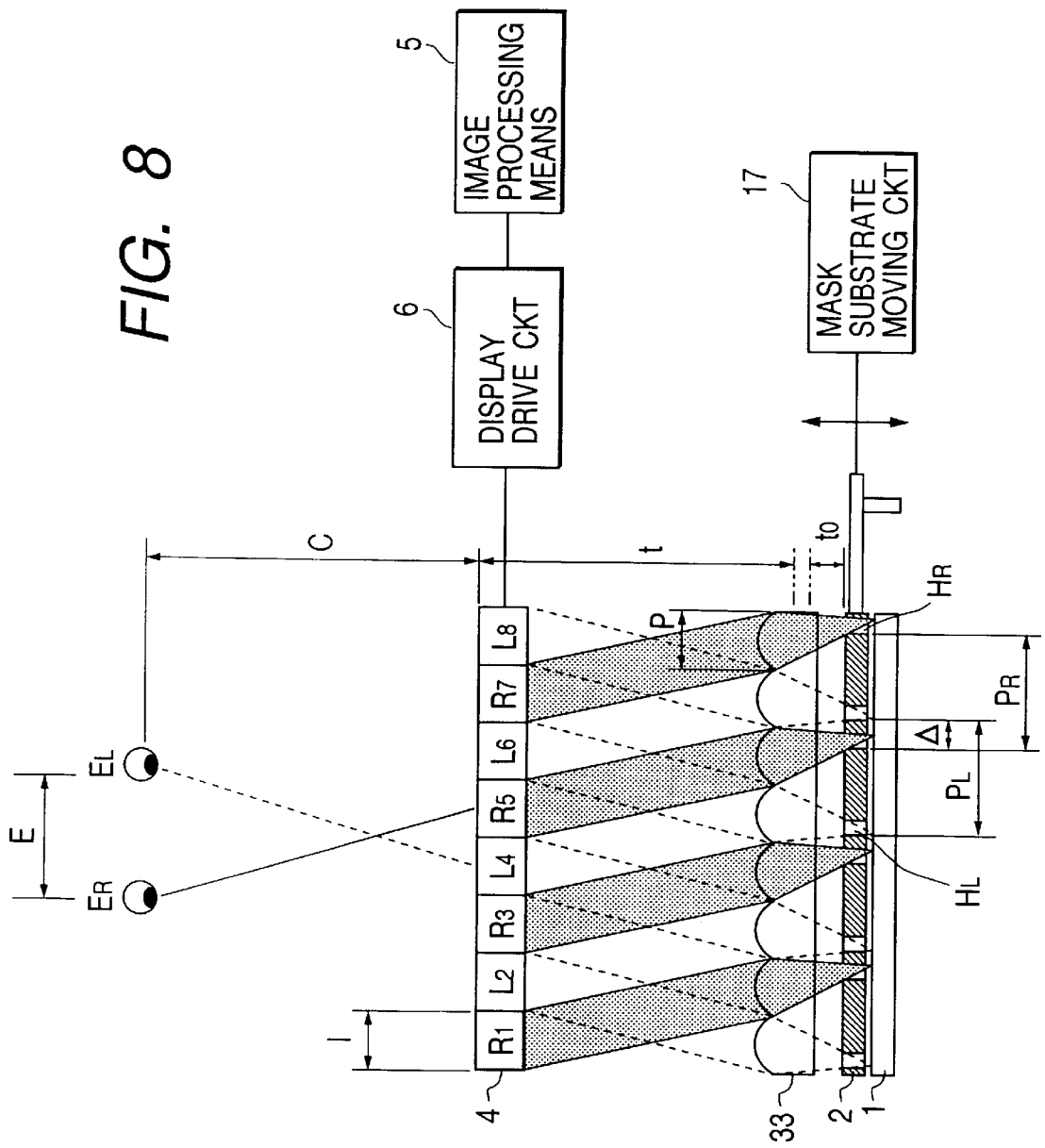
FIG 8. is an explanatory view of the arrangement and operation upon displaying a three-dimensional image in the third embodiment.

FIG. 8 is a horizontal sectional view for explaining the arrangement and operation when the apparatus of this embodiment displays a three-dimensional image. This will be explained below. Light emitted by the backlight light source (surface illuminant) 1 is given directivity by the mask 2, which has the centers of aperture portions 8 at positions offset by a predetermined amount from the optical axes of the individual cylindrical lenses constituting the lenticular lens 33, and the lenticular lens 33, and is divisionally focused on regions corresponding to the positions of right and left eyes $E_R$ and $E_L$ of the observer.

Light beams to be incident on the right and left eyes are respectively modulated by the vertical stripe pixels $R_i$ and $L_i$ displayed on a transmission type display device 4 arranged between the lenticular lens 33 and the observer, and enter the corresponding eyes. Consequently, the observer can observe a stereoscopic image.

The setting conditions of parameters in this embodiment will be explained below. As shown in FIG. 8, let I be the width of the right or left stripe pixel, C be the distance (observation distance) from the display device 4 to the focusing region (pupil position of the observer), E be the distance (the interval between the two eyes) between the centers of the two focusing regions, and t be the distance from the principal plane, on the display device 4 side, of the lenticular lens 33 to the display device 4. Then, these parameters are set to satisfy the following relation:

$$t = I \cdot C / (E/2 - I)$$

Furthermore, the pitch, P, of the lenticular lens 33, and the width I of the vertical stripe pixel satisfy the following relation:

$$P = E \cdot I / (E - 2I)$$

Let $P_{AP}$ be the period of the aperture portions 8, $P_R$ be the pitch of apertures for one eye, e.g., apertures $H_R$ for the right eye, and $P_L$ be the pitch of apertures $H_L$ for the left eye. Then, these parameters equal each other:

$$P_{AP} = P_R = P_L$$

Also, $P_{AP}$ and the width I of the vertical stripe pixel satisfy the following relation:

$$P_{AP} = 2I\{E/(E-2I) + t0/C\}$$

where t0 is the interval from the principal plane, on the mask 2 side, of the lenticular lens 33 to the mask 2.

The aperture portions $H_R$ and $H_L$ shift from each other by Δ, which is described by:

$$\Delta = (P_{AP}/2) - 2I \cdot t0/t$$

In this embodiment, since the parameters are set, as described above, crosstalk between the right and left stripe pixels can be prevented, and a satisfactory stereoscopic image can be displayed.

Figure 9:
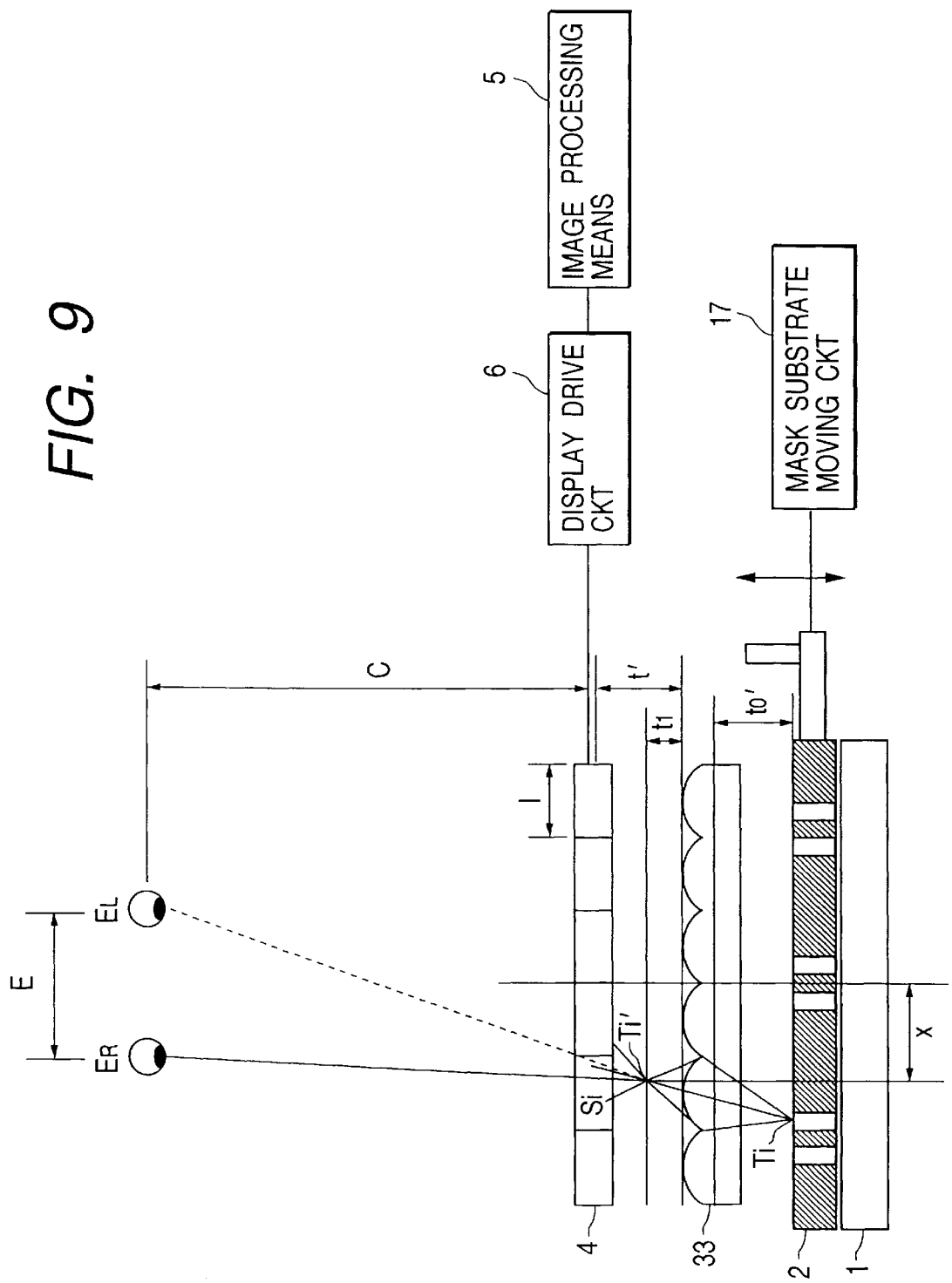
FIG. 9 is an explanatory view of the arrangement and operation upon displaying a two-dimensional image in the third embodiment.

FIG. 9 is an explanatory view of the arrangement and operation when the apparatus of this embodiment displays a two-dimensional image. In this embodiment as well, a normal two-dimensional image S is displayed on the display device 4.

Let f be the focal length of each cylindrical lens that constitutes the lenticular lens 33, t0' be the interval between the principal plane, on the mask 2 side, of the lenticular lens 33, and the mask 2 in the two-dimensional image display mode, and t1 be the distance from the principal plane, on the display device 4 side, of the lenticular lens 33 to an image of the mask 2 formed by the lenticular lens 33. Then, these parameters satisfy:

$$1/t1 = 1/f - 1/t0$$

In this embodiment, when t' represents the distance from the principal plane, on the display device 4 side, of the lenticular lens 33 to the display device 4, t' and t1 are set to satisfy:

$t'>t1$

In particular, assuming that the position of an image Ti' at a center Ti of an aperture portion 8 of the mask 2 formed by the lenticular lens 33 with respect to the i-th pixel Si is separated from the center of the display device 4 by x, the following relations preferably hold:

$$\{I(i-1)-E/2\}/\{C-(t'-t1)\} <$$
$$(x-E/2)/C < \{I(i+1)-E/2\}/\{C-(t'-t1)\}$$
$$\{I(i-1)+E/2\}/\{C-(t'-t1)\} < (x+E/2)/C <$$
$$\{I(i+1)+E/2\}/\{C-(t'-t1)\}$$

When the above relations hold, the observer can observe the image Ti' from his or her right and left eyes via the pixel Si. When the above relations hold for an arbitrary pixel Si on the display device 4, light from an arbitrary image Ti' is modulated by the pixel Si, is guided to the right and left eyes, and is recognized as a two-dimensional image free from any decrease in resolution with respect to that of the display device 4.

In this embodiment as well, the lenticular lens does not stand out and the screen surface can be prevented from glittering for the same reason as in the first embodiment.

Note that the above relations are discussed about the aperture center Ti. However, in practice, since the aperture has a given size, the above relations need not strictly hold, but need only be appropriately determined in consideration of the aperture size, aberrations of the lenticular lens 33, and the like.

In this embodiment as well, the self-emission type display element 23 such as a CRT shown in FIG. 6 may be used to form the same light-emission pattern as the mask pattern, and the patterned exit light beams may be given directivity by the lenticular lens 33. At this time, the self-emission type display element 23 and a display device 4 preferably perform display in synchronism with each other in units of pixels or scanning lines.

In this embodiment, the lenticular lens 33 having one flat surface is used as the micro optical element 3H. Alternatively, the two surfaces of each cylindrical lens that constitutes the lens 33 may have appropriate curvatures.

On the other hand, the lenticular lens 33 may be moved in place of the mask substrate 2. As described in the first embodiment, the lenticular lens 33 may be moved to satisfy the above-mentioned relations of this embodiment.

FIGS. 10A and 10B are schematic views showing an application example of the third embodiment. In this application example, a color image is displayed. As shown in the partially enlarged view of FIG. 10B (the enlarged view of a portion surrounded by an ellipse on the display device 4 in FIG. 10A), color filters R, G, and B are alternately arranged in the vertical direction on the respective pixels (the pixels $L_i$ and $R_i$) of the vertical stripes when parallax images are displayed as a vertical stripe image. With this arrangement, a satisfactory stereoscopic image free from any color misregistration can be observed.

Figure 11:
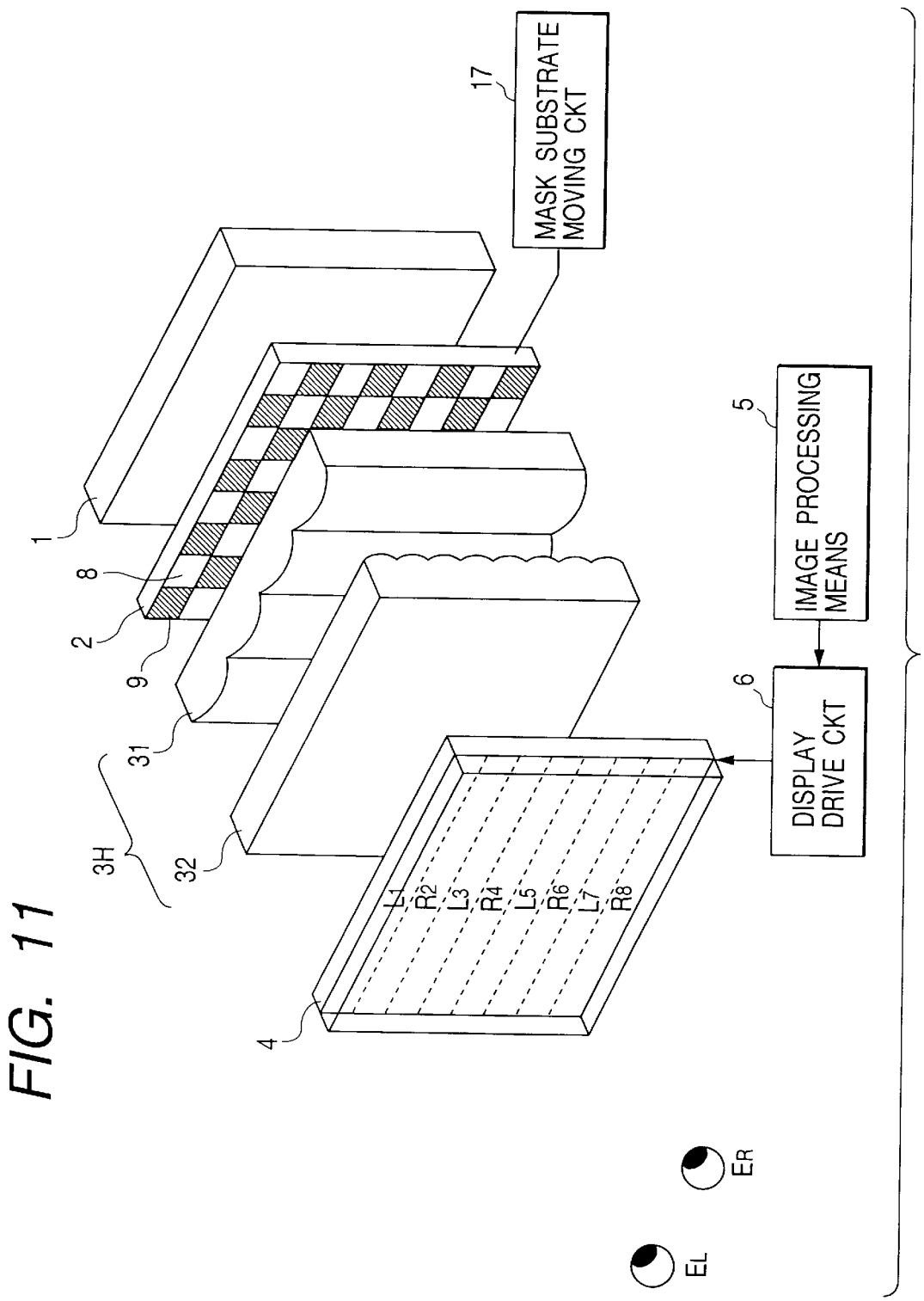
FIG. 11 is a schematic perspective view showing principal part of a stereoscopic image display apparatus according to the fourth embodiment of the present invention.

FIG. 11 is a schematic perspective view showing principal part of a stereoscopic image display apparatus according to the fourth embodiment of the present invention. In this embodiment, the differences from the first embodiment are that the lenticular lenses 31 and 32 are arranged in the different order, and the mask substrate 2 is moved in place of the lenticular lens upon changing between the 3D/2D display modes. Other arrangements are the same as those in the first embodiment.

Referring to FIG. 11, a backlight light source (surface illuminant) 1 serves as an Illumination light source, and a mask substrate 2 formed with a mask pattern having apertures for transmitting light in a checkerboard-like pattern is arranged on the observer side of the backlight light source 1. A display device 4 is arranged in front of the observer. Two lenticular lenses 31 and 32, which consist of a transparent resin or glass and have orthogonal generator directions, are arranged as a micro optical element 3H between the mask substrate 2 and the display device 4.

Figure 12:
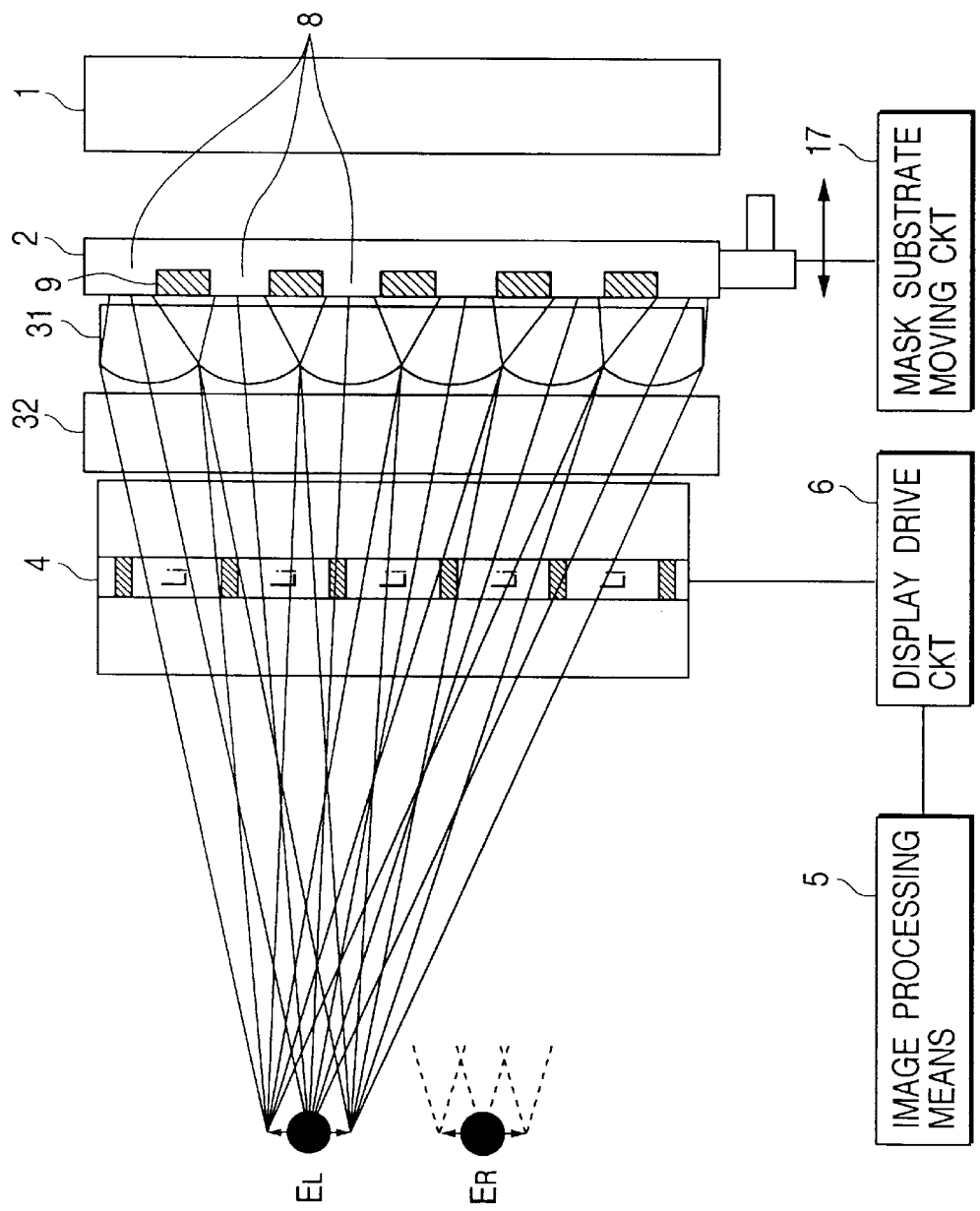
FIG. 12 is a horizontal sectional view when the apparatus of the fourth embodiment displays a three-dimensional image.

The arrangement and operation upon displaying a three-dimensional (3D) image in this embodiment will be explained below. FIG. 12 is a horizontal sectional view when the apparatus of this embodiment displays a three-dimensional image. The mask substrate 2 is illuminated with light emitted by the backlight light source 1, and light beams are output from apertures 8 of the mask substrate 2. The first lenticular lens (vertical cylindrical lens array) 31 is arranged on the observer side of the mask substrate 2, and its lens curvature is designed, so that the mask pattern 9 is located nearly at the focal point position of each cylindrical lens.

A pair of aperture and light-shielding portions in the horizontal section of the mask pattern 9 roughly corresponds to one pitch of the cylindrical lenses that constitute the lenticular lens 31. In the pattern of the aperture portions and light-shielding portions show in FIG. 12, left stripe pixels $L_i$ of a horizontal stripe image displayed on the display device 4 respectively correspond to the pairs of aperture and light-shielding portions, and divergent light beams output from the aperture portions 8 are converted into substantially collimated light beams via the first lenticular lens 31 to illuminate the left stripe pixels $L_i$ on the display device 4. After these light beams are modulated by the left stripe pixels $L_i$, they are brought to a focus with directivity within a range indicated by solid lines in FIG. 12. In FIG. 12, $E_L$ indicates the left eye of the observer, and light beams from the aperture portions 8 are evenly brought to a focus on the left eye $E_L$ over the total width of the screen.

At this time, the pitch of the first lenticular lens 31 is set to be slightly smaller than the pitch of the pair of aperture and light-shielding portions of the mask pattern. With this structure, the left stripe pixels displayed on the display deice can be observed only within the range near the left eye $E_L$.

As for a right eye $E_R$, the pattern of the aperture and light-shielding portions of the mask pattern 9 is reversed to that shown in FIG. 12, and corresponds to right stripe pixels $R_i$ of the stripe image displayed on the display device 4. That is, divergent light beams output from the aperture portions 8 are converted into substantially collimated light beams via the first lenticular lens 31 to illuminate the right stripe pixels $R_i$ on the display device 4. After these light beams are modulated by the right stripe pixels $R_i$, they are brought to a focus with directivity within a range indicated by dotted lines in FIG. 12. Hence, the right stripe pixels $R_i$ displayed on the display device are observed only within the range near the right eye $E_R$, and right and left parallax images are separately observed by the right and left images in the horizontal direction.

Figure 13:
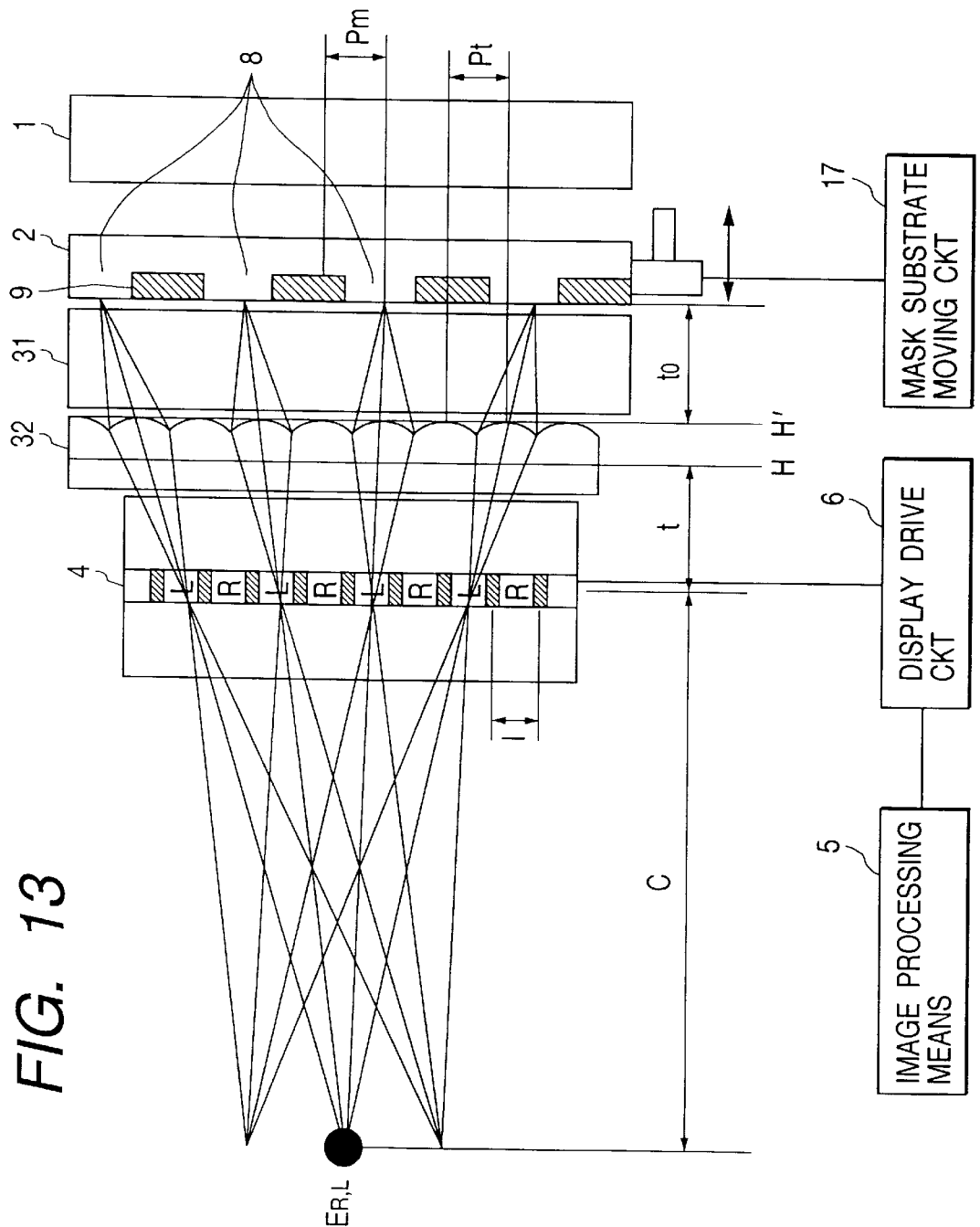
FIG. 13 is a vertical sectional view when the apparatus of the fourth embodiment displays a three-dimensional image.

FIG. 13 is a vertical sectional view when the apparatus of this embodiment displays a three-dimensional image. The observation region in the up-and-down direction will be explained with reference to FIG. 13. The apertures 8 on the mask pattern 9 of the mask substrate 2 are formed in a checkerboard pattern as shown in FIG. 11, and correspond to left or right stripe pixels displayed on the display device 4 in the up-and-down direction.

Let Pm be the pitch of the apertures in a given vertical section of the mask pattern, Pt be the pitch of the cylindrical lenses constituting the second lenticular lens (horizontal cylindrical lens array) 32, I be the pixel pitch, in the up-and-down direction, of the display device 4, C be the distance from the image display surface of the display device 4 to the observation position, t be the distance from the image display surface of the display device 4 to a principal plane H, on the observer side, of the second lenticular lens 32, and t0 be the distance from a principal plane H', on the mask side, of the second lenticular lens 32 to the mask pattern 9. Then, these parameters are set to satisfy the following relations:

$$I{:}Pm = C{:}(C + t + t0)$$

$$I{:}Pm = t{:}t0$$

$$I{:}Pt = C{:}(C + t)$$

At this time, images of the apertures 8 of the mask pattern 9 are brought to a focus near the corresponding pixels, and an image can be observed over the angle range upon focusing. Hence, the observation range where the right and left parallax images can be uniquely separately observed from a predetermined eye height position of the observer over the total width, in the up-and-down direction, of the screen, can be assured.

The arrangement and operation upon displaying a two-dimensional image in this embodiment will be described below. In this case, a normal two-dimensional image S is displayed on the display device 4.

Figure 14:
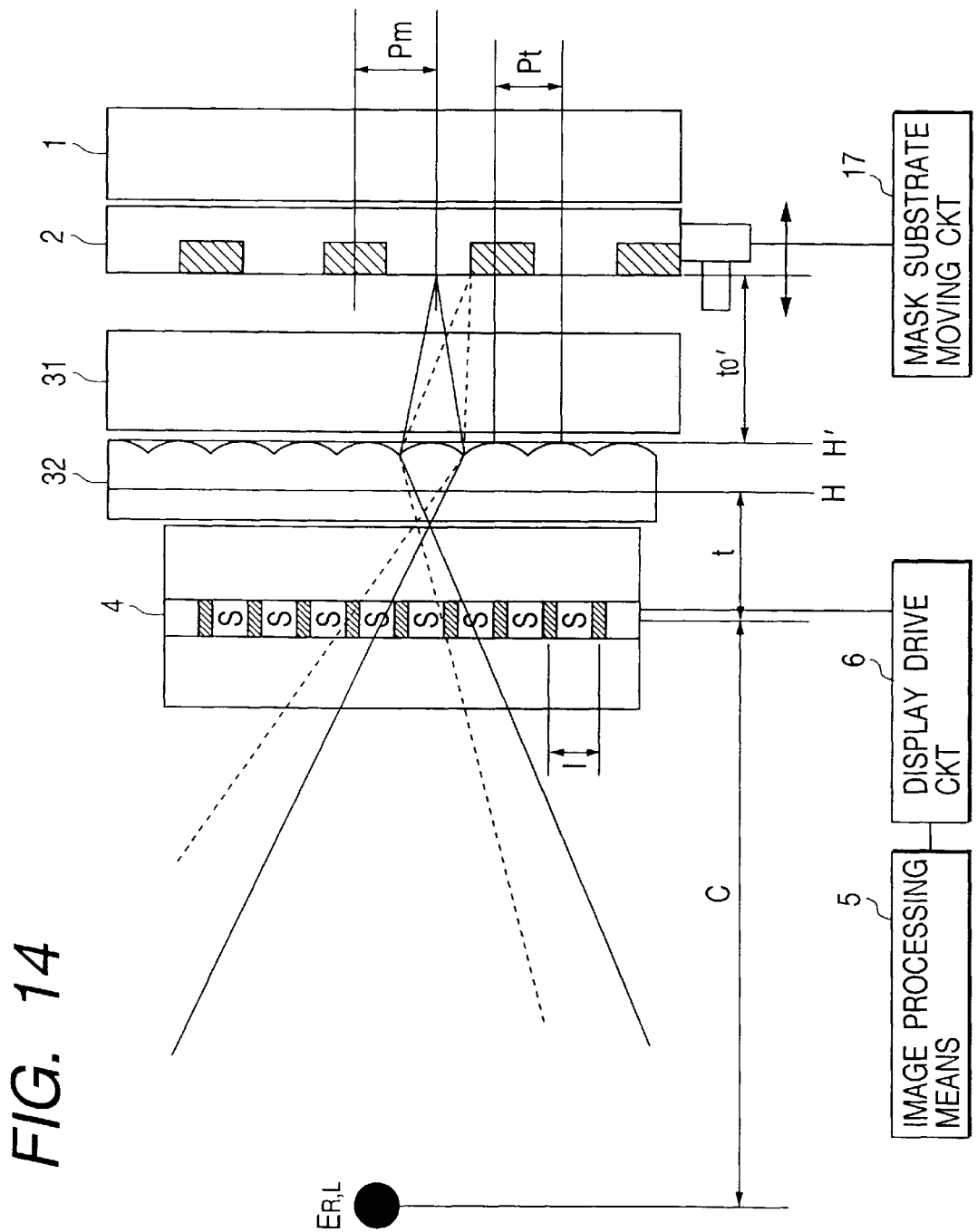
FIG. 14 is a vertical sectional view when the apparatus of the fourth embodiment displays a two-dimensional image.

FIG. 14 is a vertical sectional view when the apparatus of this embodiment displays the two-dimensional image S. At this time, the mask substrate 2 has moved to a position satisfying:

$$t0'>2fb$$

where fb is the focal length of each lens of the second lenticular lens 32, and t0' is the interval between the cylindrical surface of the second lenticular lens 32 and the mask 2.

At this time, when the distance t from the principal plane H, on the observer side, of the second lenticular lens 32 to the image display surface of the display device 4 is set in advance to satisfy:

$$1/t \geq 1/fb - 1/t0'$$

the aperture portions 8 of the mask 2 are imaged in a reduced scale on the second lenticular lens 32 side of the image display surface. Therefore, one aperture that illuminated only the horizontal stripe pixel $L_i$ or $R_i$ by the lenticular lens 32 upon displaying a three-dimensional image is imaged on a portion that can be observed from vertically neighboring scanning lines upon displaying a two-dimensional image, and light beams passing through the respective scanning lines on the image display surface propagate toward the right and left eyes and are guided to the two eyes. Hence, all the pixels of the two-dimensional image can be visually recognized by the two eyes, and a display free from any decrease in resolution with respect to the resolution of the display device 4 can be realized. The operation upon displaying the two-dimensional image has been described.

In this embodiment as well, the lenticular lens does not stand out and the screen surface can be prevented from glittering for the same reason as in the first embodiment.

In this embodiment, the lenticular lenses 31 and 32, each having one flat surface, are used as the micro optical element 3H. Alternatively, the two surfaces of each cylindrical lens may have appropriate curvatures.

In this embodiment, the lenticular lenses 31 and 32 are independently arranged. Alternatively, orthogonal cylindrical lens arrays having periodicities may be formed on the two surfaces of a single transparent substrate to obtain an integral structure.

In this embodiment, the micro optical element 3H may comprise a toric lens array 34 obtained by two-dimensionally arranging a large number of toric lenses 35 each having different vertical and horizontal curvatures in the vertical and horizontal directions.

More specifically, let Pt be the pitch, in the vertical direction, of the toric lenses 35 that constitute the toric lens array 34, t be the distance from the display device to the principal plane, on the observer side, of the toric lens array 34 in the vertical section, and t0 be the distance from the principal plane, on the mask side, of the toric lens array 34 to the mask pattern 9. Then, these parameters can be set to satisfy the above-mentioned relations.

Also, the lenticular lens may be moved in place of moving the mask substrate. In this case, the lenticular lens may be moved as in the first embodiment to satisfy the above-mentioned relations of this embodiment.

Figure 16A:
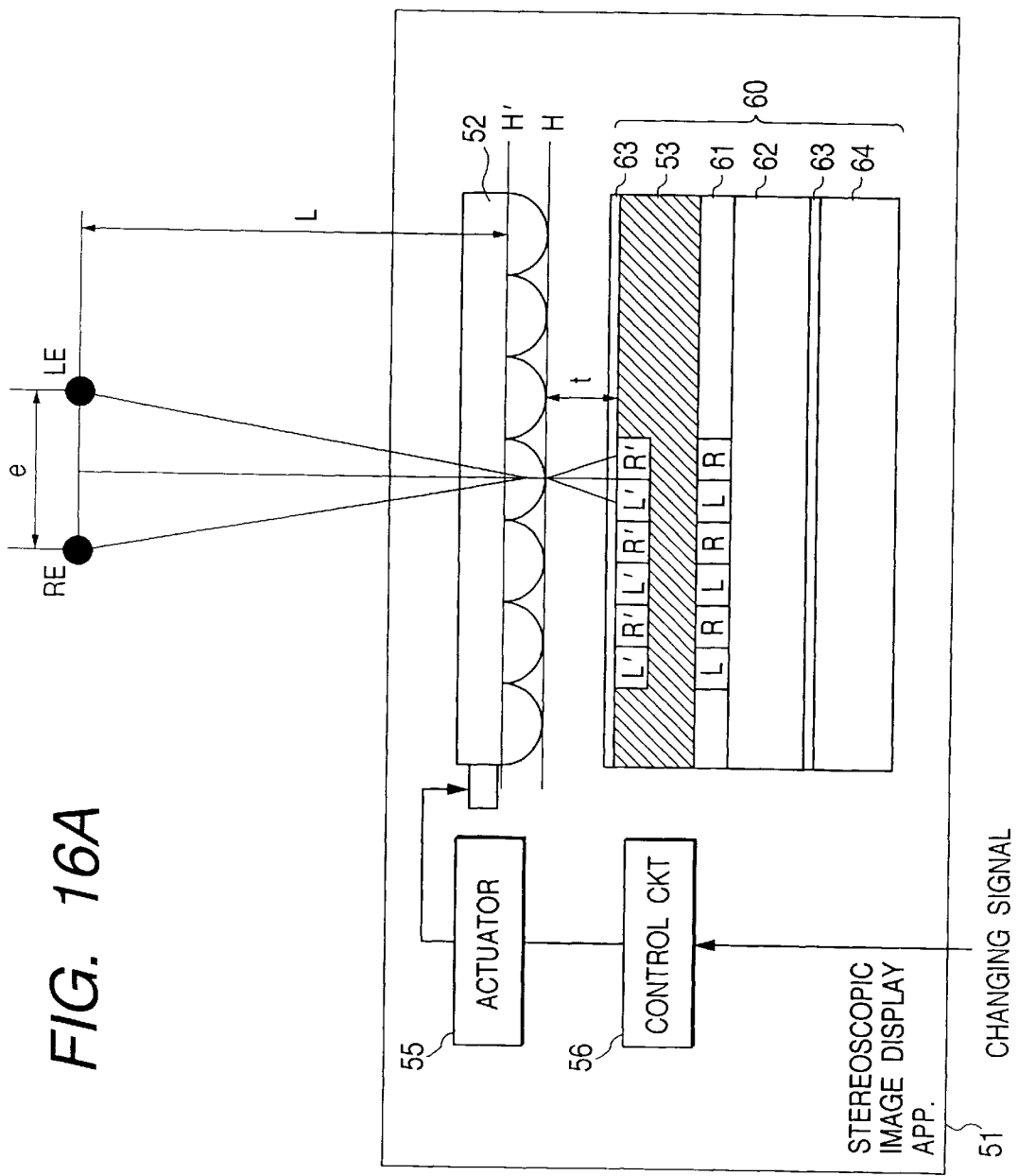
Figure 16B:
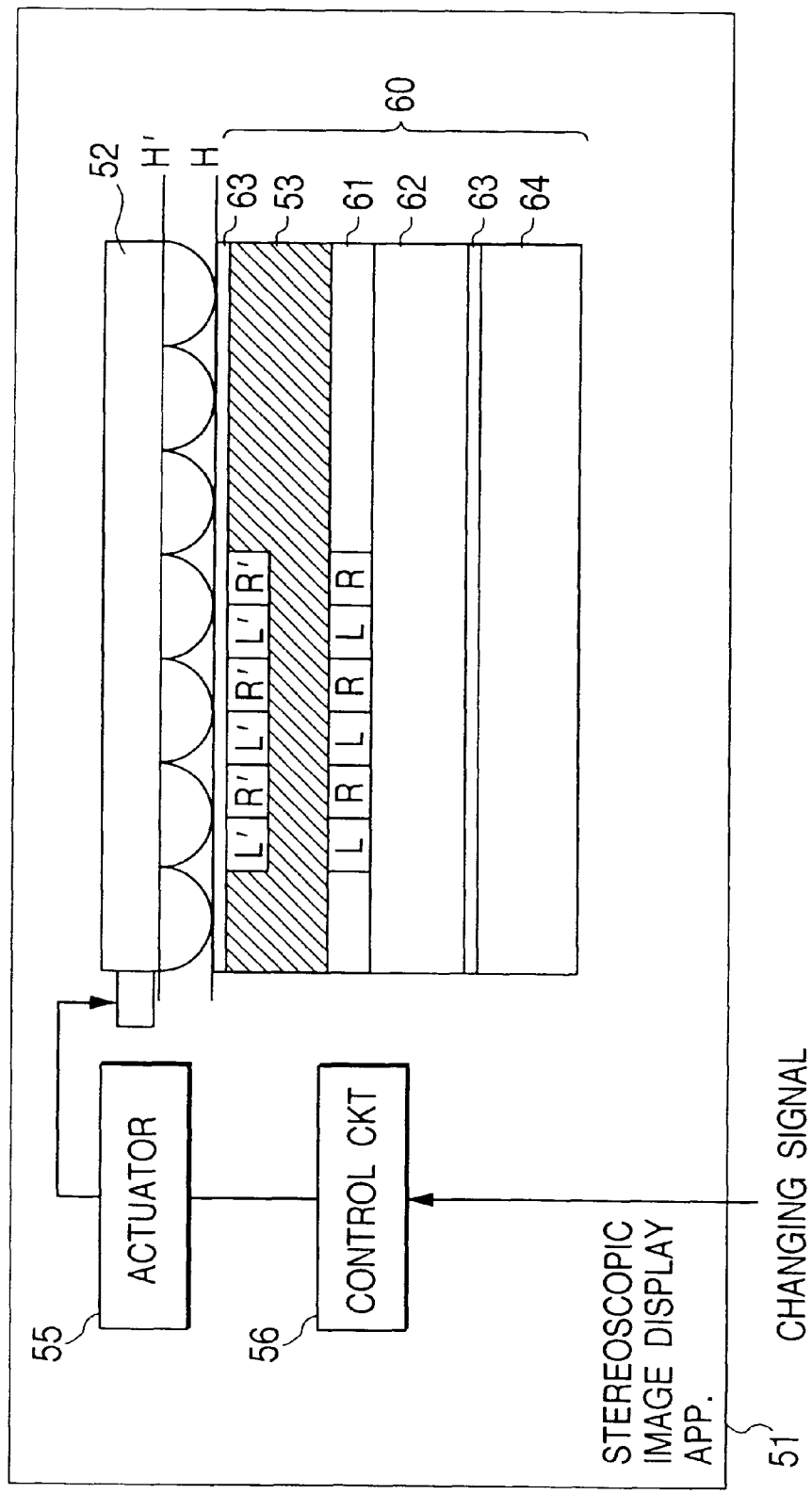

FIGS. 16A and 16B are views showing a stereoscopic image display apparatus according to the fifth embodiment of the present invention, in which FIG. 16A shows the three-dimensional image display state, and FIG. 16B shows the two-dimensional image display state.

As shown in FIGS. 16A and 16B, the apparatus of this embodiment is mainly constituted by an LCD 60 for displaying image information, a lenticular lens 52 as a first optical means which has a periodic structure of cylindrical lenses, one surface of each of which is flat and the other surface of each of which is convex, in the right-and-left direction, and which stereoscopically reconstructs image information displayed on the LCD 60 by the convex surfaces facing the LCD 60 side, an actuator 55 (changing means in this embodiment) for moving the lenticular lens 52, and a control circuit 56 for controlling the operation of the actuator 55 in accordance with an externally input changing signal. The LCD 60 is constituted by a liquid crystal layer 61 serving as an image display means for displaying image information via a liquid crystal, a substrate glass plate 62 arranged on one surface of the liquid crystal layer 61, a fiber faceplate 53 serving as a second optical means which is arranged on a surface, opposite to the substrate glass plate 62 side, of the liquid crystal layer 61 and comprises an optical element having a periodic structure, a backlight light source 64 for emitting light toward the liquid crystal layer 61 and outputting the image information in the liquid crystal layer 61, and polarization plates 63 which are arranged on the sides, which do not contact the liquid crystal layer 61, of the substrate glass plate 62 and the fiber faceplate 53, and respectively polarize light emitted by the backlight light source 64 and light transmitted through the liquid crystal layer 61. Note that the substrate glass plate 62 of the current LCD 60 having a 10" screen size normally has a thickness of 1.1 mm. Hence, the polarization state can be maintained even when the fiber faceplate 53 replaces the substrate glass plate 62 like in the LCD 60 of this embodiment, and a display image having the same quality as that of a normal LCD can be obtained.

FIG. 17 is a view for explaining the relationship between the shape and layout of the lenticular lens 52 shown in FIGS. 16A and 16B.

Let r1 and r2 be the radii of curvature of lens surfaces R1 and R2 constituting the lenticular lens 52, and n be the refractive index of the material of the lenticular lens 52. Then, the refractive power, φ1, of the lens surface R1 and the refractive power, φ2, of the lens surface R2 are respectively described by:

$$\phi 1 = (n-1)/r1 \quad (1)$$

$$\phi 2 = (1-n)/r2 \quad (2)$$

If d represents the surface interval between the lens surfaces R1 and R2, the refractive power Φ of the lenticular lens 52 is given by:

$$\Phi = \phi 1 + \phi 2 - e \cdot \phi 1 \cdot \phi 2 \quad (3)$$

where e is the air-converted distance of d, and is given by e=d/n.

On the other hand, the distances, Δ and Δ', from the vertices of the lens surfaces R1 and R2 to their principal planes H and H' are respectively defined by:

$$\Delta = R1H = e \cdot \phi 2/\Phi \quad (4)$$

$$\Delta' = R2H' = -e \cdot \phi 2/\Phi \quad (5)$$

Let P be the pixel pitch, L be the observation distance, and e be the distance between the eyes of the observer. Then, when the pitch p of the lenticular lens 52 is set to satisfy the following equation, all light beams of a pixel group that display an image from a specific view point can be guided to the corresponding view point position of the observer:

$$p = 2 \cdot P \cdot L/(e+L) \quad (6)$$

In this case, when the distance t from the image display position to the principal plane H of the lenticular lens 52 is set to nearly equal the focal length F (=1/Φ) of the lenticular lens, divergent light beams from the pixels are guided to the right and left eyes of the observer as substantially collimated light beams.

On the other hand, when the image display position is set to substantially match the principal plane H of the lenticular lens 52, the refractive power of the lenticular lens 52 can be set to be nearly ineffective.

Figure 18:
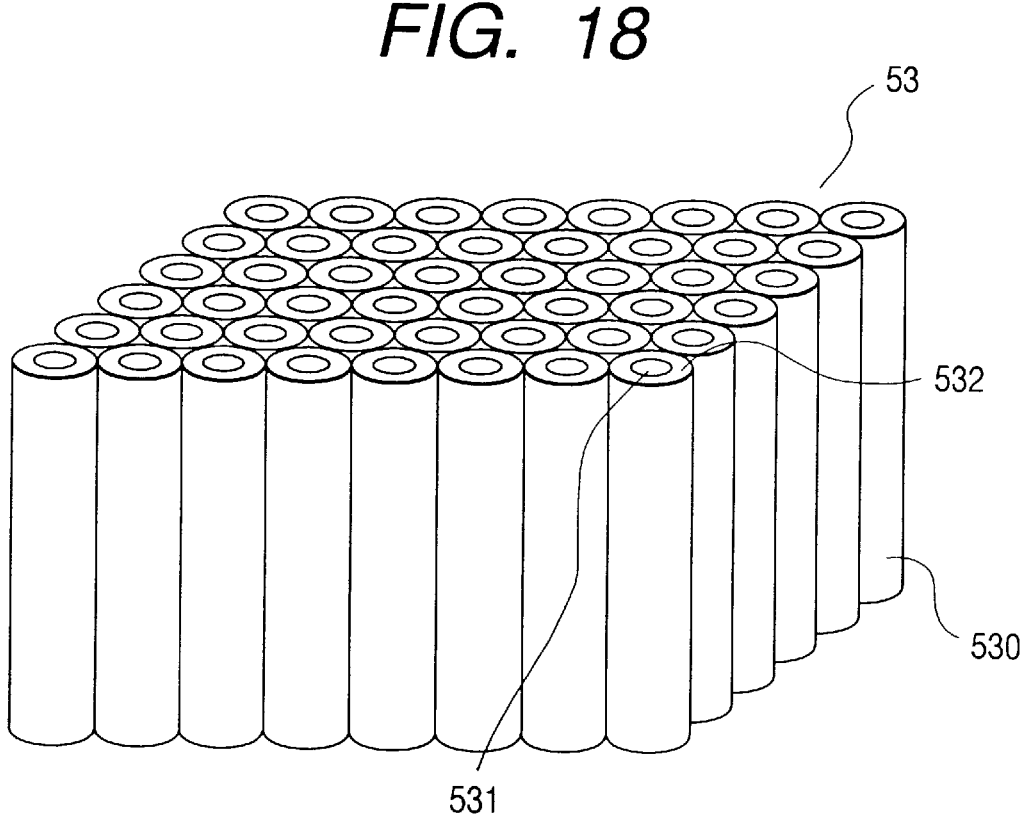
FIG. 18 is an enlarged view of principal part of a fiber faceplate shown in FIGS. 16A and 16B.

FIG. 18 is an enlarged view of principal part of the fiber faceplate 53 shown in FIGS. 16A and 16B.

As shown in FIG. 18, the fiber faceplate 53 is constituted by bundling fibers 530 each consisting of a core portion 531 and a cladding portion 532 at high density. When an image is displayed on one end face of each fiber of the fiber faceplate 53, display light of the image is transmitted through the fiber 530, and the same image is formed on the other end face at a resolution corresponding to the diameter of the fiber 530.

The image display operation of the stereoscopic image display apparatus shown in FIGS. 16A and 16B will be described below.

An image displayed on the liquid crystal layer 61 of the LCD 60 is irradiated onto the fiber faceplate 53 as an image transmission medium by light emitted by the backlight light source 64, and is displayed on the end face, opposite to the liquid crystal layer 61, of the fiber faceplate 53 via the fiber faceplate 53.

More specifically, the image display surface can be considered not as the surface of the liquid crystal layer 61 which originally serves as an image display surface but the end face, on the side opposite to the liquid crystal layer 61, of the fiber faceplate 53.

Since the lenticular lens 52 in this embodiment has convex surfaces on the LCD 60 side and a flat surface on the opposite side, r2=∞ can be set in equation (2) above, and this yields φ2=0 and Φ=φ1 from equation (1).

Substitution of them into equation (4) yields:

$$\Delta = 0$$

That is, the position of the principal plane H of the lenticular lens 52 matches the vertices of the convex surfaces.

Accordingly, as shown in FIG. 16A, when the distance t from the end face of the fiber faceplate 63 as the image display surface to the principal plane H of the lenticular lens 52 (predetermined first distance between first optical means and second optical means) is set to equal the focal length of the lenticular lens 52, the same stereoscopic view as in the conventional lenticular type stereoscopic image display apparatus can be realized.

Also, as shown in FIG. 16B, when the convex surfaces of the lenticular lens 52 are in tight contact with the polarization plate 63 on the front surface of the fiber faceplate 53 on which an image is displayed (so predetermined second distance between first optical means and second optical means=thickness of polarization plate 63), since the polarization plate 63 has a very small thickness, the refractive power of the lenticular lens 52 can be set to be nearly zero. For this reason, with this layout, both the light beams from the portions of pixels L and R displayed on the LCD 60 are guided to the eyes RE and LE of the observer, and the observer can observe all the pixels on the image display surface with his or her both eyes. Therefore, an identical image need not be displayed on the pair of neighboring pixels R and L unlike in the conventional stereoscopic image display apparatus, and image display free from any decrease in resolution with respect to that of the LCD 60 can be realized.

FIGS. 19A and 19B are views showing a stereoscopic image display apparatus according to the sixth embodiment of the present invention, in which FIG. 19A shows the three-dimensional image display state, and FIG. 19B shows the two-dimensional image display state.

The apparatus of this embodiment is mainly constituted by an LCD 160 as an image display means for displaying image information, a lenticular lens 152 as an optical means which has a periodic structure of cylindrical lenses, one surface of each of which is flat and the other surface of each of which is convex, in the right-and-left direction, and which stereoscopically reconstructs image information displayed on the LCD 160 while its flat surface faces the LCD 160 side, a distributed index lens array 183 which is arranged between the lenticular lens 152 and the LCD 160, and forms an imaging surface 154 consisting of R' and L' pixel groups by forming equal-magnification erected images of R and L pixel groups, which constitute a stripe image displayed on the LCD 160, in units of pixels, an actuator 155 for moving the lenticular lens 152, and a control circuit 156 for controlling the operation of the actuator 155 in accordance with an externally input changing signal. The LCD 160 is constituted by a liquid crystal layer 161 for displaying display image information by a liquid crystal, two substrate glass plates 162 arranged to sandwich the liquid crystal layer 161 therebetween, a backlight light source 164 for emitting light toward the liquid crystal layer 161 and outputting image information in the liquid crystal layer 161, and polarization plates 163 which are arranged on the sides, which do not contact the liquid crystal layer 161, of the two substrate glass plates 162, and respectively polarize light emitted by the backlight light source 164 and light transmitted through the liquid crystal layer 161.

The image display operation of the stereoscopic image display apparatus shown in FIGS. 19A and 19B will be described below.

Equal-magnification erected images of R and L pixel groups that constitute a stripe image displayed on the liquid crystal layer 161 of the LCD 160 are respectively formed by the distributed index lens array 183 in units of pixels, thus forming the imaging surface 154 consisting of R' and L' pixel groups.

When a three-dimensional image is to be displayed, the distance, t, from the imaging surface 154 to the principal plane, H, of the lenticular lens 152 is set to equal the focal length of the lenticular lens 152, as shown in FIG. 19A, so that light rays from the R' and L' pixel group on the imaging surface 154 are respectively guided to the right and left eyes RE and LE of the observer by the refractive power of the lenticular lens 152.

On the other hand, as shown in FIG. 19B, when the distance from the principal plane H of the lenticular lens 152 to the imaging surface 154 on which an image is displayed is set to be nearly zero, the refractive power of the lenticular lens 152 can be set to be substantially zero. For this reason, with this layout, light beams from the R and L pixel portions displayed on the LCD 160 can be respectively guided to the two eyes RE and LE of the observer, and the observer can observe all the pixels on the image display screen with his or her both eyes. Therefore, image display can be attained at the same resolution as that of a normal two-dimensional image display apparatus.

Since this embodiment does not require any special LCD panel used in the fifth embodiment, the cost required for the LCD panel manufacturing process can be reduced.

What is claimed is:

1. A stereoscopic image display apparatus comprising:
   light source means for emitting a light beam having a predetermined shape;
   a transmission type display device for displaying a selected one of a stripe combination image in which respective stripe pixels of a plurality of parallax images are alternatively arranged to be combined, and one two-dimensional image;
   a micro optical means arranged between said light source means and said display device and having different optical effects in horizontal and vertical directions
   changing means for selectively changing the distance between said light source means and said micro optical means, wherein said changing means sets the distance to a first distance by which the light beam through the stripe pixels corresponding to a first parallax image in said stripe combination image and light beam through the stripe pixels corresponding to a second parallax image in said stripe combination image in the light beam which is emitted from said light source means and to which a directivity is given by said micro optical means are respectively directed to one of the eyes of an observer and the other of the eyes of the observer so as to be recognized as a stereoscopic image for the observer when said stripe combination image is displayed, and said changing means sets the distance to a second distance by which the light beam which is emitted from said light source means and to which a directivity is given by said micro optical means is caused to enter said display device so that light beams respectively emerging from a plurality of scanning lines of said two-dimensional image are directed to both the left and right eyes of the observer when said two-dimensional image is displayed.

2. An apparatus according to claim 1, wherein said light source means comprises a surface illuminant, and a mask substrate consisting of aperture portions and light-shielding portions each having a predetermined shape, and illuminates said mask substrate with light emitted by said surface illuminant and illuminates said micro optical means with light beams emerging from the aperture portions.

3. An apparatus according to claim 2, wherein said changing means changes an interval between said mask substrate and said micro optical means.

4. An apparatus according to claim 1, wherein said light source means comprises a self-emission type display element having a light-emission surface consisting of light-emitting portions and non-emitting portions each having a predetermined shape.

5. An apparatus according to claim 4, wherein said changing means changes an interval between said light-emission surface and said micro optical means.

6. An apparatus according to claim 1, wherein said micro optical means comprises a vertical cylindrical lens array constituted by periodically arranging vertically elongated cylindrical lenses in the horizontal direction, and a horizontal cylindrical lens array constituted by periodically arranging horizontally elongated cylindrical lenses in the vertical direction.

7. An apparatus according to claim 6, wherein when said stripe combination image is displayed on said display device, said changing means sets a distance from a principal plane, on the light source means side, of said horizontal cylindrical lens array to said light source means to be substantially zero.

8. An apparatus according to claim 6, wherein when said two-dimensional image is displayed on said display device, said changing means sets a distance from a principal plane, on the light source means side, of said horizontal cylindrical lens array to said light source means to be a value not less than twice a focal length of the cylindrical lenses which constitute said horizontal cylindrical lens array.

9. An apparatus according to claim 6, wherein when said two-dimensional image is displayed on said display device, and when f represents the focal length of said vertical cylindrical lens array, t0' represents the distance from a principal plane, on the light source means side, of said horizontal cylindrical lens array to said light source means, and t' represents the distance between a principal plane, on the observer side, of said horizontal cylindrical lens array and said display device, the parameters satisfy:

$$t'/t0' > f/(t0'-f).$$

10. An apparatus according to claim 1, wherein said micro optical means comprises a toric lens array constituted by two-dimensionally arranging toric lenses, each having different vertical and horizontal focal lengths, in the vertical and horizontal directions.

11. An apparatus according to claim 10, wherein when said two-dimensional image is displayed on said display device, said adjusting means sets a distance from a principal plane, on the light source means side, of said toric lens array to said light source means to be a value not less than twice the vertical focal length of the toric lenses which constitute said toric lens array.

12. A stereoscopic image display apparatus comprising:
   image display means for displaying a selected one of a stripe combination image in which respective stripe pixels of a plurality of parallax images are alternatively arranged to be combined, and one two-dimensional image;

first optical means for refracting a light beam from said image display means having different optical effects in horizontal and vertical directions;

second optical means, arranged between said image display means and said first optical means, for forming the image of said image display means toward said first optical means; and changing means for changing a distance between said second optical means and said first optical means, wherein said changing means sets the distance to a first distance by which the light beam through the stripe pixels corresponding to a first parallax image in said stripe combination image and light beam through the stripe pixels corresponding to a second parallax image in said stripe combination image in the light beam which emerges from said second optical means and to which a directivity is given by said first optical means are respectively directed to one of the eyes of an observer and the other of the eyes of the observer so as to be recognized as a stereoscopic image for the observer when said stripe combination image is displayed, and said changing means sets the distance to a second distance by which the light beam from said display means is caused to emerge from said second optical means and to be given a directivity by said first optical means, so that the light beams respectively emerging from a plurality of scanning lines of said two-dimensional image are directed to both the left and right eyes of the observer when said two-dimensional image is displayed.

13. An apparatus according to claim 12, wherein said changing means moves said first optical means.

14. An apparatus according to claim 12, wherein when said stripe combination image is displayed, said changing means sets a distance between an image forming position formed by said second optical means and a principal plane of said first optical means to substantially equal a focal length of said first optical means.

15. An apparatus according to claim 12, wherein when said two-dimensional image is displayed, said changing means sets an image forming position formed by said second optical means to substantially match a principal plane of said first optical means.

16. An apparatus according to claim 12, wherein said second optical means comprises an optical element having a periodic structure.

* * * * *

UNITED STATES PATENT AND TRADEMARK OFFICE
CERTIFICATE OF CORRECTION

PATENT NO. : 6,061,179
DATED : May 9, 2000
INVENTOR(S) : Kazutaka Inoguchi et al.

It is certified that error appears in the above-identified patent and that said Letters Patent is hereby corrected as shown below:

Column 3,
Line 15, "display mode" should read -- image display mode --.

Column 6,
Line 8, "I/tt$\geq$I/fb-I/tt" should read -- I/tt$\geq$I/fb-I/tt --.

Column 8,
Line 63, "I/tI=I/f-I/tO" should read -- I/tI=I/f-I/tO' --.

Column 11,
Line 46, I/t$\geq$I/fb-I/tO'" should read -- I/t$\geq$I/fb-I/tO' --.

Column 14,
Line 2, "$\phi 2$=0and" should read -- $\phi 2 = 0$ and --.

Column 15, claim 1,
Line 44, insert -- and -- after "vertical directions".

Signed and Sealed this

Nineteenth Day of February, 2002

Attest:

Attesting Officer

JAMES E. ROGAN
*Director of the United States Patent and Trademark Office*